United States Patent [19]

Beale

[11] 4,171,029
[45] Oct. 16, 1979

[54] VEHICLE PROPULSION SYSTEM WITH INERTIAL STORAGE

[75] Inventor: Julian R. A. Beale, Relgate, England

[73] Assignee: U.S. Philips Corporation, New York, N.Y.

[21] Appl. No.: 757,356

[22] Filed: Jan. 6, 1977

Related U.S. Application Data

[63] Continuation of Ser. No. 575,489, May 8, 1975, abandoned.

[30] Foreign Application Priority Data

May 10, 1974 [GB] United Kingdom ............... 20773/74

[51] Int. Cl.² .......................... B60K 17/00; B60K 9/04
[52] U.S. Cl. ..................................... 180/54 R; 74/751
[58] Field of Search ............... 180/54 R, 1 R; 74/751; 60/418, 414

[56] References Cited

U.S. PATENT DOCUMENTS

| 2,118,590 | 5/1938 | Chilton | 74/751 X |
| 2,803,151 | 8/1957 | Clerk | 74/751 |
| 2,935,899 | 5/1960 | Nallinger | 180/1 R X |
| 3,734,222 | 5/1973 | Bardwick | 180/54 X |
| 3,749,194 | 7/1973 | Bardwick | 180/54 R |
| 3,882,950 | 5/1975 | Strohlein | 180/54 R |
| 3,886,810 | 6/1975 | Sugiyama et al. | 74/751 |

FOREIGN PATENT DOCUMENTS 1078971 8/1967 United Kingdom ................. 180/77 X Primary Examiner—Joseph F. Peters, Jr.
Assistant Examiner—Milton L. Smith
Attorney, Agent, or Firm—David R. Treacy

[57] ABSTRACT

A vehicle propulsion and re-generative braking arrangement providing multi-mode operation with an engine and/or energy storage flywheel coupled to an automatic transmission. An electronic control has driver-selectable control programs offering maximum economy, or enhanced accelerating power, or extra power. A novel clutch protects against flywheel over-speeding and full engine braking is provided when the flywheel is overcharged.

3 Claims, 28 Drawing Figures

VEHICLE PROPULSION SYSTEM WITH INERTIAL STORAGE

This is a continuation of application Ser. No. 575,489, filed May 8, 1975 and now abandoned.

BACKGROUND OF THE INVENTION

1. Field of the Invention This invention relates to propulsion arrangements for wheeled vehicles.

The present-day motor car is inefficient mainly because it has to operate over a wide range of speeds using a single engine. Its use for long journeys at high speeds may decline somewhat with improved inter-city public transport and with increasing cost of gasoline, but its use for short door-to-door journeys, for which it is very convenient, will undoubtedly continue. These short journeys will also remain the main reason for the car's inefficiency, unless a way is found of circumventing the inefficiency of the internal combustion engine when it is operating at less than about one-tenth of its maximum power (e.g. supplying power to propel a car at less than 35 m.p.h. when it is capable of propelling the car at 85 m.p.h). This inefficiency arises mainly from the mechanical losses in the engine, which losses are largely independent of output torque and amount to 20-25% of maximum torque. They cannot be made insignificantly small by reducing the speed of the engine because of its limited range of efficient operation. The car's efficiency is further reduced by its fuel consumption during retardation (using the brakes or engine braking), during idling in traffic and during rapid opening of the throttle for high acceleration.

A potentially attractive way of reducing fuel consumption is to use for a wheeled vehicle a propulsion arrangement of a character comprising a prime mover constituting a source of power for propelling the vehicle and an inertial energy store, separate from the prime mover, which can be charged with mechanical energy and can also serve for propelling the vehicle.

The prime mover of a propulsion arrangement of the above character can be, for instance, a gasoline- or diesel-fuelled internal combustion engine, or an electric motor which is energised from a battery carried on the vehicle. The inertial energy store is suitably a fixed mass flywheel. Hereinafter, for the sake of convenience, the word "engine" is used to denote any form of prime mover and the word "flywheel" is used to denote any form of inertial energy store.

2. Description of the Prior Art

Propulsion arrangements of the above character are already known and, in general, include coupling means by which a vehicle drive shaft can be connected through suitable gearing to the engine alone, to the flywheel alone, or to the engine and the flywheel together. The coupling means also connect the engine to the flywheel, so that within the propulsion arrangement there can be flow of mechanical power in either direction between any pair of the three inter-connectable elements (engine, flywheel and vehicle drive shaft) of the arrangement. However, it is believed that hitherto these six available directions of mechanical power flow have not been used to the best advantage.

A known method of operation of the propulsion arrangement is to use selectively energy stored in the flywheel to provide power only to supplement, and not to replace, power produced by the engine in propelling the vehicle, for instance during periods of acceleration of the vehicle, while power from both the vehicle and the engine is used to store energy in the flywheel at other selected times, for instance during retardation or braking of the vehicle and during periods when there is excess power available from the engine above that required to maintain the vehicle in a prevailing running condition. With this method of operation, the flywheel is likely, at a journey's end, to be storing useful energy which will be wasted. Also, other work done to date on these propulsion arrangements having an assisting flywheel has been largely of a mechanical nature, focussing on the construction of high energy-density flywheels (which aggravate the energy waste at the end of a journey in the above method of operation), and on the consequent problems of reducing high windage losses, of overcoming gyroscopic effects, of increasing bearing life and of overcoming safety hazards, for instance by containment, in the event of a burst flywheel. The main reasons for wanting a high energy-density flywheel are that more auxiliary power is available to increase maximum vehicle acceleration, particularly on up-gradients, the period for which the auxiliary power can be sustained is longer, and more energy can be stored in the flywheel during regenerative braking, particularly on down-gradients.

SUMMARY OF THE INVENTION

1. Operating Modes

The present invention is based on the concepts that first, the benefits from a flywheel as an auxiliary source of power arise mainly on short vehicle journeys, when vehicle speeds are generally low, so that it is not useful to store in the flywheel a lot of energy which will be dissipated at a journey's end. Thus only a relatively low energy-density flywheel need be used. Secondly, with the flexibility of electronic control to regulate the power flow within the propulsion arrangement so as to utilise with advantage the six available directions of mechanical power flow by disconnecting and reconnecting the engine and flywheel as required, it becomes possible to achieve the potential benefits of a high energy-density flywheel using only a relatively low energy-density flywheel, but without the attendant disadvantages of cost, safety hazards, high gyroscopic forces, increased maintenance and inefficiency on short vehicle journeys.

According to the present invention there is provided a propulsion arrangement for a wheeled vehicle, said arrangement comprising an engine, a flywheel which can be charged with mechanical energy, coupling means which are operable for interconnecting the engine, the flywheel and a drive shaft of the vehicle, variable torque converting or transmission means through which connection is made to the drive shaft, and electronic control means for controlling the power supplied by the engine and the input/output ratio of the torque converting means, and for selectively operating the coupling means such that in use the arrangement can assume any one of the following modes, namely, an engine only mode in which the engine alone is connected to the vehicle drive shaft, a flywheel only mode in which the flywheel alone is connected to the vehicle drive shaft, and a flywheel plus engine mode in which both the flywheel and the engine are connected to the vehicle drive shaft, the mode selection permitting power flow between the vehicle drive shaft and, the engine, the flywheel, or the flywheel plus engine, as the case may be, in one direction in respect of vehicle propulsion and in the other direction in respect of vehicle retardation.

In carrying the invention into effect, the control exercised by the electronic control means is preferably such that the engine speed and torque pertain to a region of minimum specific fuel consumption of the engine at least part of the time the engine is being used. The power output of the engine in this region is generally much greater than that required to propel the vehicle, and the excess power from the engine can be used to store energy in the flywheel. When the flywheel is fully charged, the engine is disconnected from the vehicle drive shaft and its speed can then be reduced to a very low (idling) value or to zero (engine switched off), so that its fuel consumption and mechanical power losses are negligible. The energy stored in the flywheel can now be used to propel the vehicle. This is the flywheel only mode. When the useful energy in the flywheel has been used, so that the flywheel is discharged, the engine is re-connected to the vehicle drive shaft, and the engine is then used to both propel the vehicle and re-charge the flywheel. This is the flywheel plus engine mode, in which the total available power for propelling the vehicle can be greater than that obtained from the engine alone, once the flywheel has been re-charged. However, when the power obtained is greater than that provided by the engine alone, the flywheel is slowing down. If the flywheel becomes discharged, it is disconnected from the vehicle drive shaft, thereby allowing the engine to be speeded up and thus to deliver its maximum power. This is the engine only mode.

In the above context, the word "disconnected" means that any torque that may still be transmitted to the "disconnected" member constitutes a negligible loss to the remaining active part of the propulsion arrangement. The object in disconnecting the engine is to make fuel consumption negligible both directly by using little or no fuel and indirectly by absorbing negligible power from the rest of the system. The object in disconnecting the flywheel is to allow the engine to be speeded up to deliver up to its full power and the disconnection must be sufficiently complete that both the rate of acceleration of the engine and the power available for propulsion are essentially unaffected by any residual torque. However, the disconnection of the flywheel can with advantage leave a small keep alive torque transmitted thereto sufficient to maintain the flywheel speed above a specified low speed at which the flywheel is considered to be discharged. This small keep alive torque can be arranged to be transmitted to the flywheel only when the engine speed is above the specified low speed, by using a centrifugal device.

The task of managing the power flow properly in each of the three modes and of managing the transitions between modes are carried out automatically by the electronic control means. These automatic mode changes can be much more frequent than could be contemplated with a manual system.

In a simple realization of the invention the electronic control means is responsive:

(i) when the flywheel is fully discharged in the flywheel only mode, to cause change to the flywheel plus engine mode;

(ii) when the flywheel is fully discharged in the flywheel plus engine mode to cause change to the engine only mode subject to the next condition (iii);

(iii) to permit change to the engine only mode by condition (ii) only if there is insufficient engine power available to re-charge the flywheel in the flywheel plus engine mode; and (iv) when the flywheel is fully charged in the flywheel plus engine mode, to cause change to the flywheel only mode.

Preferably, the electronic control means is further responsive:

(v) when the flywheel is over-charged in the flywheel only mode, to cause change to the flywheel plus engine mode.

The electronic control means can also be responsive:

(vi) when the flywheel is over-charged in the flywheel plus engine mode, to maintain that mode.

Additionally, the electronic control means can be responsive:

(vii) when the flywheel speed in the engine only mode is too low for the flywheel to be re-engaged synchronously having regard to the minimum acceptable engine speed, to maintain the engine only mode;

(viii) when the flywheel speed in the engine only mode is too low for the flywheel to be re-engaged synchronously having regard to the prevailing vehicle drive shaft speed, to maintain the engine only mode; and (ix) when in the engine only mode there is available engine power to re-charge the flywheel, to cause change to the flywheel plus engine mode.

The conditions (vii) to (ix) can alternatively be performed indirectly by the electronic control means by suitably controlling the engine speed in the engine only mode and at the same time only causing change to the flywheel plus engine mode when the engine and flywheel speeds synchronize, the engine speed being controlled such that it is always above the minimum acceptable engine speed of condition (vii) so that this condition is effectively imposed, together with condition (viii) because the engine is already connected to the vehicle drive shaft, whilst condition (ix) is imposed by using a sufficiently high engine speed for a given value of power required for propulsion so that the engine torque in the engine only mode is less than the maximum torque the engine is required to supply in the flywheel plus engine mode.

In a more complex realization of the invention, the electronic control means is further responsive:

(x) to cause change from the flywheel only mode to the engine plus flywheel mode when the torque at the input of the torque convertor means exceeds a specified value;

(xi) to cause change from the flywheel plus engine mode to the flywheel only mode before the flywheel is fully charged if no power is being demanded from the propulsion arrangement;

(xii) to prevent change from the flywheel plus engine mode to the flywheel only mode by condition (vi) when power demanded from the propulsion arrangement is above a specified value;

(xiii) when in the flywheel plus engine mode the flywheel is fully charged and the power being demanded from the arrangement is not above the specified value of condition (xii), to cause change to the engine only mode or the flywheel only mode according as, respectively, the vehicle speed is above or below a specified value;

(xiv) to prevent change from the engine only mode to the flywheel plus engine mode by condition (ix) or the equivalent unless the flywheel is fully discharged;

(xv) to prevent condition (xiv) maintaining the engine only mode when the flywheel is not fully discharged and instead cause change to the flywheel plus engine mode, when no power is being demanded from the propulsion arrangement;

(xvi) to prevent condition (xiv) maintaining the engine only mode as otherwise allowed by condition (xv) when the flywheel is not fully discharged and instead cause change to the flywheel plus engine mode when the vehicle speed is below a specified value; and (xvii) when the engine only mode is otherwise maintained by condition (ix) or the equivalent, to cause change to the flywheel plus engine mode when the flywheel is already sufficiently charged to contribute to the power demand.

In the foregoing paragraphs, the flywheel is deemed "fully discharged" when its speed falls to a low target speed and is deemed "fully charged" when its speed reaches a high target speed. Preferably, as will be described, the low and high target speeds for the flywheel are not constant values. Also, the flywheel is deemed "over-charged" when its speed reaches a maximum target speed which also, preferably, is not a constant value. In the invention as so far described, different values of target speeds serve to provide hysteresis between the mode changes to prevent too frequent transitions between the modes.

2. Principal Transducers

For implementing the control functions of the electronic control means, the propulsion arrangement suitably includes transducers for producing a plurality of speed signals which are respectively representative of the speeds of rotation of the flywheel shaft, the output shaft of the engine and the output shaft of the torque converting means, and sensors responsive to actuation of vehicle propulsion and retardation control members for producing input control signals indicative of the extent of such actuation, the electronic control means being responsive to these signals to produce output control signals for determining the speed of rotation of the engine and the input/output ratio of the torque convertor means and also for determining the interconnection between the engine, the flywheel and the vehicle drive shaft.

Conveniently, a further transducer is provided for producing a speed signal which is representative of the speed of rotation of the input shaft to the torque convertor means. This avoids the need for using either the engine output shaft speed signal or the flywheel shaft speed signal in determining the input/output speed ratio of the torque convertor means.

3. Driver-selected Control Programs

Preferably, the electronic control means regulates the power flow within the arrangement differently for each of a plurality of control programs each of which is selectable, the electronic control means being responsive in a different way for each control program (for the same extent of actuation of the vehicle propulsion and retardation members).

The control programs pertain to different driving strategies and a driver of the vehicle is able to select a control program according to the type of driving he anticipates for the immediate future, for example, driving for maximum fuel economy, town driving, or driving for maximum vehicle performance. For each control program the electronic control means functions with different parameters for selecting input/output ratio variation of the torque convertor means, the engine and flywheel speeds, and the times of engagement and disengagement of the various coupling means, with a view to achieving maximum efficiency of operation. It is also intended philosophy that for each control program, the vehicle should have substantially a completely normal "feel" to a driver although in fact the driver will have no direct control of either engine or transmission.

The preference for a plurality of different control programs arises from the fact that the most advantageous flywheel speed (energy) and rate of change of speed (± power flow) depends markedly on general road conditions and a driver's general intentions. To obtain a satisfactory overall performance the driver should be able to bias the propulsion arrangement into a suitable operating range (as with a gear lever and gearbox in a conventional vehicle propulsion arrangement) and it will then respond to his instantaneous commands as indicated by the vehicle propulsion and retardation members (accelerator and brake pedals) in a seemingly normal way. When prolonged power flow in either direction takes the flywheel out of its prescribed working range, the flywheel is disengaged or no longer used to absorb power and the driver's commands are fulfilled by the engine and brakes alone. The transition should be no more evident than a gear change in a conventional automatic transmission.

In an embodiment of the invention to be described with reference to the drawings, four different control programs are provided.

BRIEF DESCRIPTION OF THE DRAWING

In order that the invention may be more fully understood, and in considering further features therefore, reference will now be made, by way of example, to the accompanying drawings, of which.

DESCRIPTION OF THE PREFERRED EMBODIMENT

1. General Arrangement

Figure 1:
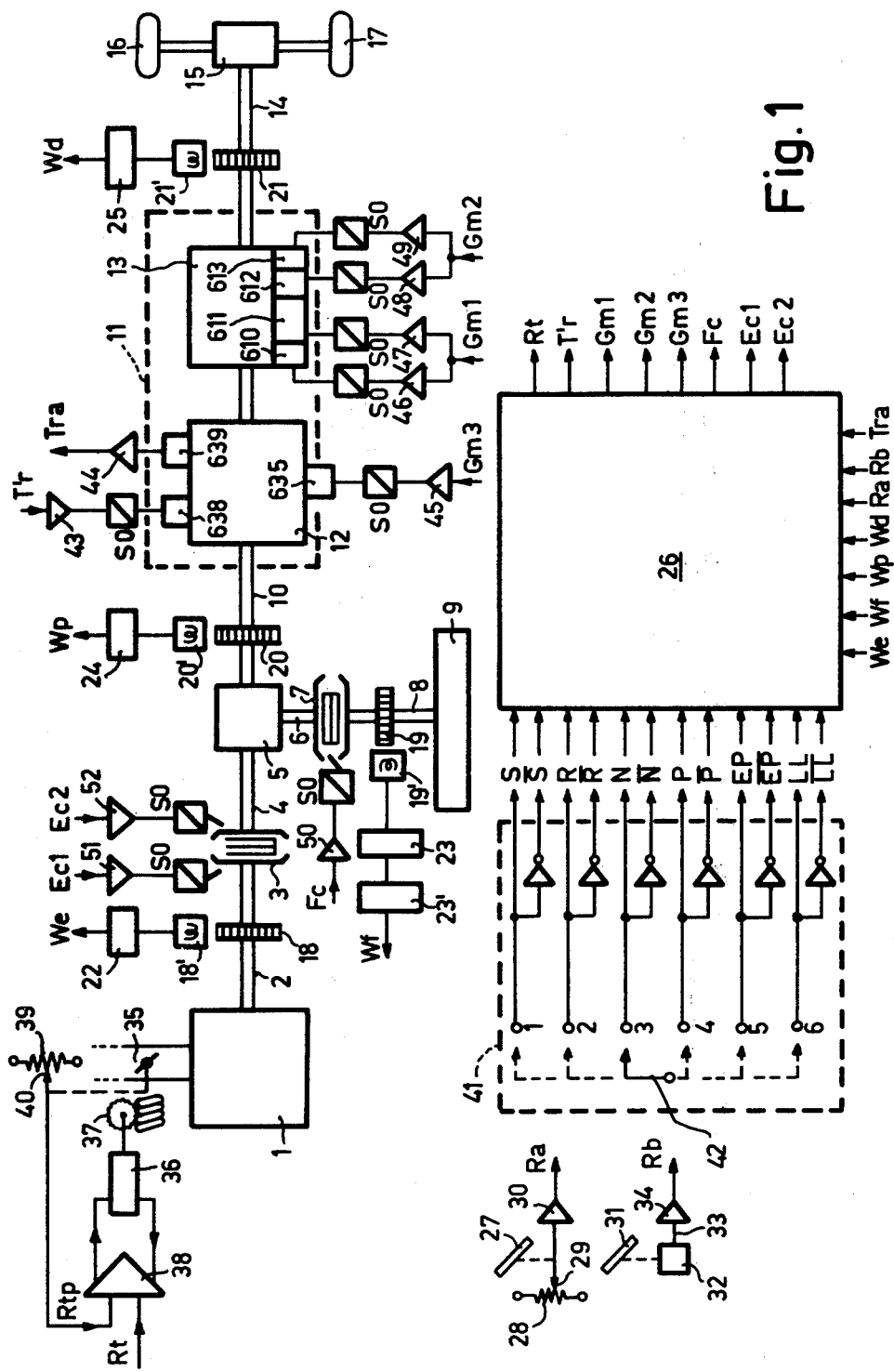
FIG. 1 is a schematic diagram of a propulsion arrangement according to the invention.

Referring to the drawings, the propulsion arrangement shown diagrammatically in FIG. 1 comprises, as its prime mover, a conventional internal combustion engine 1 of the spark ignition (gasoline-fuelled) type. This engine 1 has its output (crank) shaft 2 coupled through an engine clutch 3 to one shaft 4 of a fixed ratio gear 5. The fixed ratio gear 5 has a second shaft 6 coupled through a flywheel clutch 7 to the shaft 8 of a flywheel 9, and a third shaft 10 which is connected to the input side of a continuously variable transmission 11. The fixed gear 5 provides a unity 1:1 gear ratio between the shafts 4 and 10 and a reduction 3:1 gear ratio between the shaft 6 and both the shafts 4 and 10. The continuously variable transmission 11, which forms the torque converting means of the arrangement, is of the Perbury type (as will be described), and comprises a rolling assembly 12 and an epicyclic gear 13. A vehicle drive shaft 14 is connected between the output side of the gear 11 and a differential gear 15 of a vehicle for which the arrangement is provided. Road wheels 16 and 17 are connected in conventional manner to the differential gear 15.

Before considering the electronic control circuit for this propulsion arrangement, it is to consider worthwhile various exemplary mechanical details of the arrangement because these impose mechanical limitations that have to be taken into account in the control strategies implemented by the electronic control circuit.

A vehicle, for which the preferred embodiment propulsion arrangement to be described is suited, is a midrange family sedan as typified by current 2-liter vehicles. The existing gearbox of such a vehicle is replaced by the fixed ratio gear 5, flywheel clutch 7, flywheel 9 and continuously variable transmission 11 of the propulsion arrangement. The flywheel 9 is a disc of 1040 carbon steel 16 inches in diameter and 1.4 inches thick, and weighs 80 lbs. It will have a total energy at 9000 r.p.m. of 245,000 ft. lbs. which approximates the kinetic energy of the vehicle at 50 m.p.h. In practice, the total energy of the flywheel 9 is not available, a usable maximum to minimum ratio of flywheel speed being about 2:1. This gives 75% availability of energy which, however, is further reduced by the usual drive line losses in the vehicles transmission. It is estimated that the flywheel 9 will propel the vehicle for about 1¼ minutes at a steady 30 m.p.h.

To reduce windage loss, the flywheel 9 is enclosed in an evacuated enclosure (not shown), using a small vacuum pump to reduce the enclosure pressure to about 10 mm. Hg, which gives a windage loss of about 0.1 h.p. The maximum flywheel speed is limited to about 10,500 r.p.m. to limit gyroscopic forces and to provide a large safety margin of working stress.

2. Clutch Details

Figure 2:
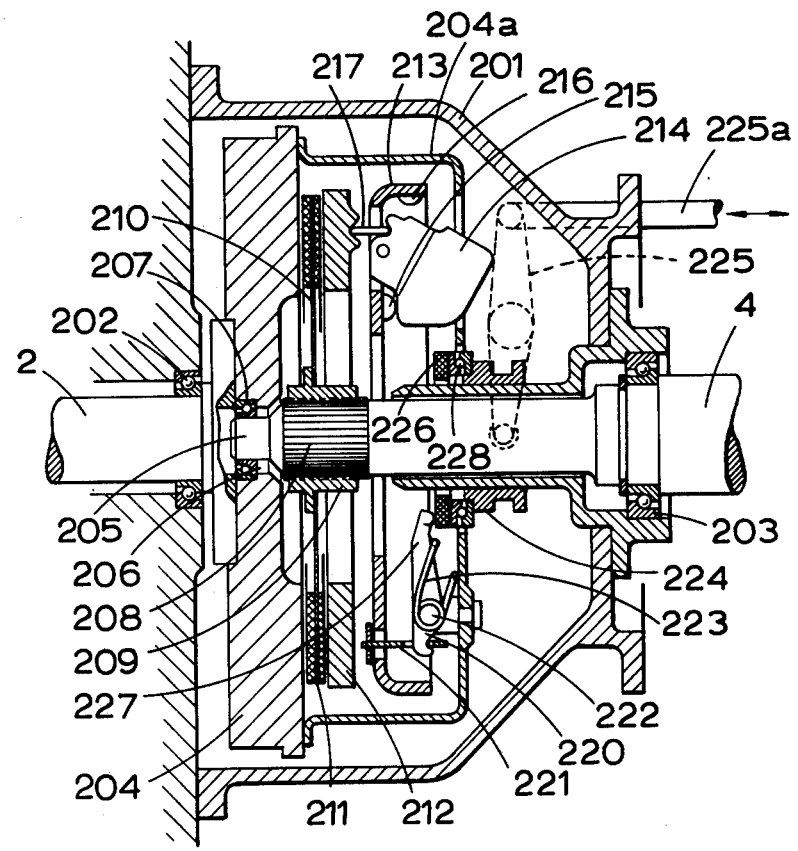
FIGS. 2 and 2a are a cross-sectional side view of an engine clutch and an enlarged portion thereof used in the arrangement of FIG. 1.

The engine clutch 3 of the propulsion arrangement of FIG. 1 can have the form shown in FIG. 2. This engine clutch, which has a centrifugal action and can also be engaged and disengaged hydraulically, is enclosed in a bell housing 201 into which the engine crankshaft 2 extends at one side and into which the shaft 4 extends at the other side. Bearings 202 and 203 are provided, respectively, for the shafts 2 and 4. A flywheel 204 for the engine is mounted for rotation with the shaft 2 within the bell housing 201. A reduced diameter portion 205 of the shaft 4 extends into a central annular recess 206 of the flywheel 204, this portion 205 being supported by bearings 207. A full diameter portion 208 of the shaft 4 adjacent the reduced diameter portion 205 is splined and a collar 209 is slidable axially of the shaft 4 along this splined portion 208. This collar 209 is keyed to the splines of the portion 208 so as to be rotatable with the shaft 4. The collar 209 carries a flexible disc 210 at the periphery of which are provided annular friction plates 211. A pressure plate 212, through a central aperture of which the collar 209 extends, is displaceable axially along the shaft 4 to urge the friction plate 211 into frictional engagement with the surface of the flywheel 204 facing it, thereby to effect friction coupling between the shafts 2 and 4.

At the side of the pressure plate 212 away from the friction plate 211 there is provided a flanged annular reactor plate 213 which is movable axially of the shaft 4 and on which are pivotally mounted a plurality of centrifugal bob weights such as bob weight 214, each of which normally lies against a stop 215 but which is pivotal by centrifugal force into engagement with a stop 216 when there is sufficient speed of rotation of the reactor plate 213.

Figure 2A:
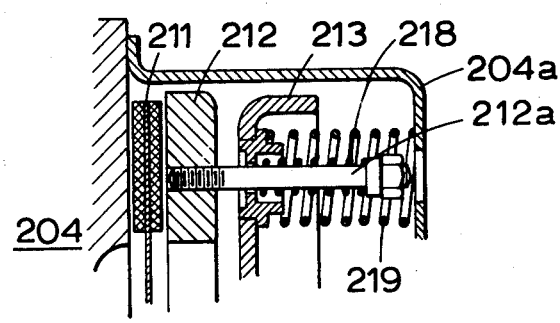

Interposed between the bob weights 214 and adjacent the periphery of the reactor plate 213 are assemblies as shown in FIG. 2a. Each of these assemblies comprises a thrust spring 218 which acts on the end collar of a thrust member 212a which is secured to the pressure plate 212, and a reactor spring 219 which acts between the reactor plate 213 and a member 204a secured to the flywheel 204. In the quiescent condition of the engine clutch, the thrust springs (218) tend to urge the pressure plate 212 towards the reactor plate 213, but the actual position of the pressure plate 212 relative to the reactor plate 213 is fixed by struts, such as strut 217, which act against the bob weights 214, causing them to pivot and engage with their respective limit stop 215. Thus, the reactor plate 213 and the pressure plate 212 are movable axially of the shaft 4 together.

The reactor springs (219) act to urge the reactor plate 213 and pressure plate 212 together towards the friction plate 211, but their actual position relative to the friction plate 211 is fixed by the engagement of a plurality of release levers, such as release lever 220, with respective links, such as link 221, attached to the reactor plate 213. Each release lever 220 is pivotally mounted on a pivot 222 about which it tends to be urged clockwise (as seen in the drawing) by the action of the reactor springs (219) which urge the reactor plate 213 to the left.

As the bob weights (214) pivot towards engagement with their stops (216) they displace the thrust members (217) against the force of the thrust springs (218). This displacement of the thrust members allows the pressure plate 212 to urge the friction plate 211 into frictional engagement with the flywheel surface facing it, as aforesaid, to effect the friction coupling between the shafts 2 and 4. Further pivoting of the bob weights (214) urge the reactor plate 213 towards the right (as seen in the drawing) against the force of the reactor springs (219).

A collar 224 is mounted for sliding movement axially of the shaft 4 under the control of a linkage 225 which is hydraulically actuated, as will be described. This collar 224 has provided thereon a thrust pad 226 which is engaged by lever arms (227) of the release levers 220. The thrust pad 226 is mounted on bearings 228 so as to be rotatable. In the position of the collar 224 and thrust pad 226 shown in the drawing, frictional engagement of the friction plate 211 with the facing surface of the flywheel 204 can be due to centrifugal action only. When the linkage 225 is actuated to move the collar 224 to the right (as seen in the drawing), there can be clockwise movement of the release levers (220), because of the new position of the thrust pad 226, to allow the springs 219 to urge the reactor plate 213 together with the pressure plate 212 against the friction plate 211 even when the bob weights (214) are against their stops (215). The springs (223) maintain engagement of the release levers (220) with the links (221) secured to the reactor plate 213. Conversely, when the linkage 225 is actuated to move the collar 224 to the left (as seen in the drawing), there is counter-clockwise movement of the release lever 220 because of the new position of the thrust pad 226. As a consequence, the engagement of the release levers (220) with the links (221) causes the reactor plate 213 together with the pressure plate 212 to be pulled away from the friction plate 211 against the force of the reactor springs (219) even when the bob weights (214) are against their stops (216).

Figure 3:
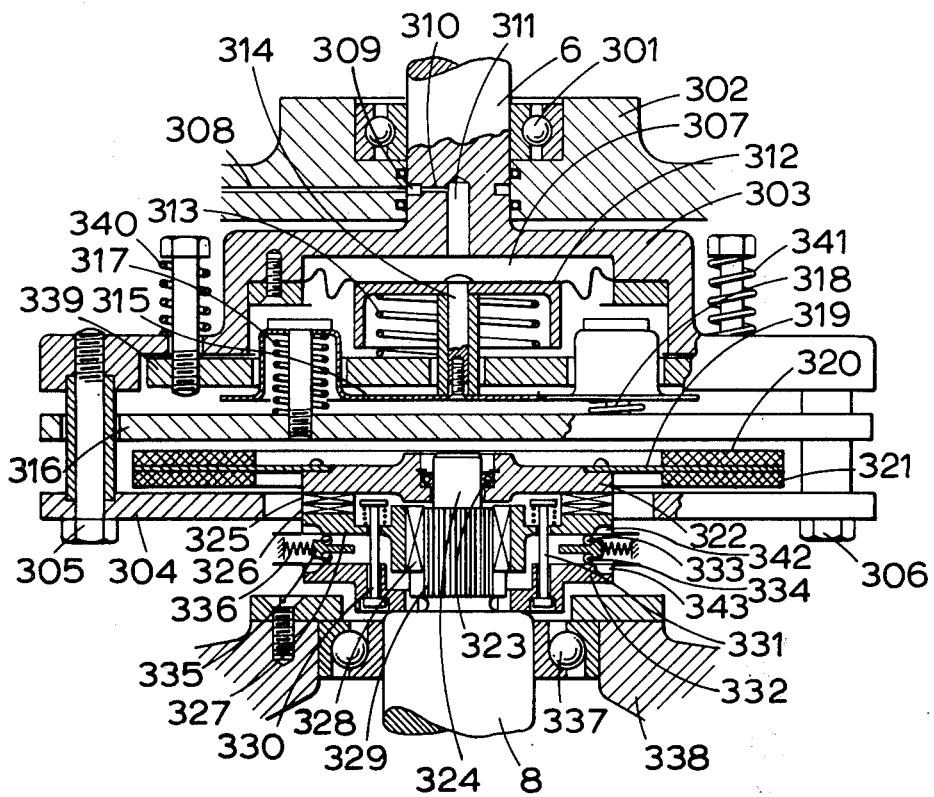
FIG. 3 is a cross-sectional top view of a flywheel clutch used in the arrangement of FIG. 1.

The flywheel clutch 7 of the propulsion arrangement of FIG. 1 can have the form shown in FIG. 3. This flywheel clutch provides coupling between the shaft 6 from the fixed gear 5 and the flywheel shaft 8. The shaft 6 is supported at its end adjacent the flywheel clutch by bearings 301 which are secured in a fixed mounting part 302. This end of the shaft 6 is formed as a recessed flange 303 to which an end plate 304 is secured by means of bolts such as bolts 305 and 306.

The main clutch assembly is accommodated in the region between the flange 303 and the end plate 304. This main clutch assembly comprises a fluid pressure chamber 307 into which fluid can enter from a fluid connection 308 which communicates with the chamber 307 through an annular groove 309, a bore 310 and a central bore 311 in the shaft 6. Fluid pressure in the chamber 307 acts on a flanged annular plate 312 against the force of a spring 313. The plate 312 has secured to it a piston 314 the end of which abuts an auxiliary reactor plate 315 which is held out of engagement with a pressure plate 316 by springs such as spring 317 and 318. An annular disc 319, which is displaceable axially of the shaft 8, and has annular friction pads 320 and 321 secured to opposite sides thereof, is secured to a central member 322 which has a center aperture 323 into which extends a reduced diameter end portion 324 of the shaft 8. This central member 323 also has axial castellations shown at 325 which are co-operable with further axial castellations shown at 326 on a movable part 327 of a dog clutch assembly. The part 327, which is movable axially of the shaft 8, has a central hollow cylindrical grooved part 328 through which a second reduced diameter splined portion 329 of the shaft 8 extends. Two springs and pin assemblies 330 and 331 act to urge the movable part 327 towards an outer fixed part 332 of the dog clutch assembly. Interposed between the two parts 327 and 332 are two (or more) centrifugal devices each comprising a pair of rollers or balls 333 and 334 which are separated by a weight 335 which is urged towards the shaft 8 by a spring 336. Bearings 337 are provided adjacent the flywheel clutch for the main diameter portion of the shaft 8, these bearings 337 being secured to a fixed mounting part 338.

In the quiescent condition of the flywheel clutch as shown in the drawing, which condition obtains in the absence of fluid pressure applied from the fluid connection 308 and when the speed of the shaft 6 is below a specified value (e.g. a value corresponding to an engine crankshaft speed of 1500 r.p.m.), the clutch is fully disengaged so that there is no coupling between the shafts 6 and 8. A centrifugal force is produced by fluid in the chamber 307 whenever the shaft 6 is rotating. This centrifugal force acts on the plate 312, but the opposing force exerted on the plate 312 by the spring 313 is greater than this centrifugal force until the speed of the shaft 6 is above the specified value. When the centrifugal force becomes greater than the force of the spring 313, it displaces the plate 312 so that the piston 314 displaces the auxiliary reactor plate 315. This displacement tends to compress the springs 317 and 318 with the result that they exert a limited force to displace the pressure plate 316 so that the friction pads 320 and 321 are clamped between the pressure plate 316 and the end plate 304 to provide a keep alive friction coupling between the shafts 6 and 8. However, this friction coupling is torque limited, being due only to the springs 317 and 318.

Friction coupling at full torque between the shafts 6 and 8 is effected by the application of fluid pressure into the chamber 307 from the fluid connection 308. This fluid pressure displaces the plate 312 sufficiently for the outer end of its flange to engage and thereafter displace a main reactor plate 339 against the force exerted by springs such as springs 340 and 341. Also, the end of the piston 314 is "bottomed" with the auxiliary reactor plate 315 engaging the pressure plate 316. Thus, the main reactor plate 339, acting through the auxiliary reactor plate 315, displaces the pressure plate 316 to clamp the friction pads 320 and 321 with full force between the pressure plate 316 and the end plate 304 and so provide the friction coupling at full torque between the shafts 6 and 8.

When the speed of the shaft 8 is above a specified value, i.e., the flywheel excessively is over-speeding, in each centrifugal device the weight 335 is moved from between the pair of rollers or balls 333, 334 by a centrifugal force which is greater than the force exerted by the spring 336. This allows the balls or rollers 333, 334 to be moved outwardly to a position where they enter respective recesses 342 and 343, thereby permitting the two assemblies 330 and 331 to displace the movable part 327 towards the fixed part 332 of the dog clutch assembly. As a result, the clutch plate 326 disengages from the clutch plate 325 to de-couple the shaft 8 from the shaft 6.

Figure 4:
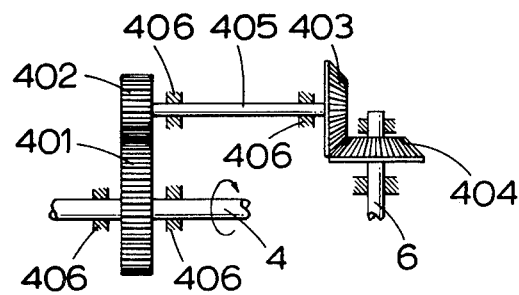
FIG. 4 is an enlarged top view of a fixed gear used in the arrangement of FIG. 1.

The fixed gear 5 in the propulsion arrangement of FIG. 1 can simply comprise, as shown in FIG. 4, a gear assembly comprising two gear wheels 401 and 402 giving a gear ratio greater than 2.5:1, (e.g. 3:1), and a bevel gear assembly comprising two bevel gear wheels 403 and 404. The larger gear wheel 401 of the gear assembly is secured to the shaft 4 which is directly connected to, or can also serve as, the shaft 10. The smaller gear wheel 402 is secured to a counter shaft 405 to which is also secured the bevel gear wheel 403. The other bevel gear wheel 404 is secured to the shaft 6 leading to the flywheel clutch 7. Bearings for the shafts 4, 6 and 407 are represented by the elements 406.

3. Variable Ratio Transmission

Figure 5:
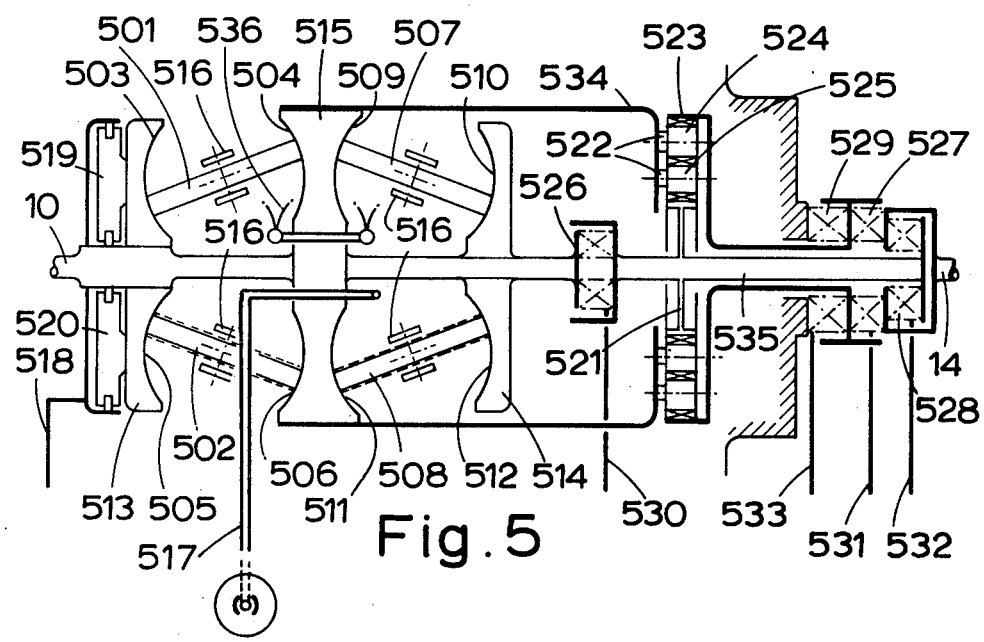
FIGS. 5 and 5a are top and end views, partially schematic, and 5b and 5c are schematic diagrams of mechanical details of a continuously variable gear used in the arrangement of FIG. 1.

The continuously variable transmission 11 of the propulsion arrangement of FIG. 1 has the form shown in FIG. 5. The rolling assembly 12 of the transmission 11 comprises a first set of three disc rollers 501, 502 and 502' for transmitting a friction rolling drive between toroidal surfaces 503, 505 and 504, 506, respectively, and a second set of three disc rollers 507, 508 and 508' for transmitting a friction rolling drive between toroidal surfaces 509, 511 and 510, 512, respectively. The toroidal surface 503, 505 is formed on a first input drive member 513 which is splined on the input shaft 10 (FIG. 1) of the rolling assembly 12. Similarly, the toroidal surface 510, 512 is formed on a second input drive member 514 which is also secured to the input shaft 10. The other toroidal surfaces 504, 506, and 509, 511 are formed on an output drive member 515 which is rotatable relative to the shaft 10. The positions of the points of contact of each disc roller with the co-operating toroidal surfaces determine the gear ratio of the rolling assembly. Depending on the angle of the disc rollers the gear ratio can be a reduction or an increase ratio. The disc rollers are "steered" to the required angle by a small movement of the axes of their carriers, represented at 516, which also sustain the torque reaction on them. This movement is made, and the torque reaction held, by fluid pressure. It is not though necessary for the purposes of the present invention to show or describe the carriers represented at 516 in detail, but briefly, each carrier is connected by a swivel coupling to a limb of a rocker lever 536 which is pivotable about a pin carried by a leg of a common fixed spider. Inwardly extending limbs of the rocker levers 536 are received in guide members in a common torque equallizing control sleeve which is shiftable rotationally by fluid pressure to control the angle of the disc rollers. This type of continuously variable gear, known as the Perbury gear, is described in "Perbury Continuously Variable Ratio Transmission", Advances in Automobile Engineering (Part II), July 1963, pp. 123-139. United Kingdom Pat. No. 1,078,791 also discloses this type of continuously variable gear.

A member 517 represents a torque arm connected to the control sleeve. This torque arm, which transmits a reaction torque proportional to the sum of the input and output torque of the rolling assembly, is shiftable by fluid pressure to vary the angle of the disc roller carriers to steer the disc rollers to provide different input/output ratios of the rolling assembly. This fluid pressure, being proportional to the torque, is also used to end-load the rolling assembly. A fluid pressure connection 518 introduces this fluid pressure behind an annular end thrust cylinder 519, 520.

The overall ratio change of the rolling assembly 12 is about 6:1. In order to extend the total effective ratio range of the gear 11 so that continuous change is possible down to zero forward speed (and also into reverse) the epicyclic gear 13 is provided. This combination also has the advantage that the direction of rotation of the vehicle drive shaft 14 (FIG. 1) can be made to correspond with that of the shaft 10 without further gearing. These two shafts would have reverse directions of rotation using only the rolling assembly.

Figure 5A:
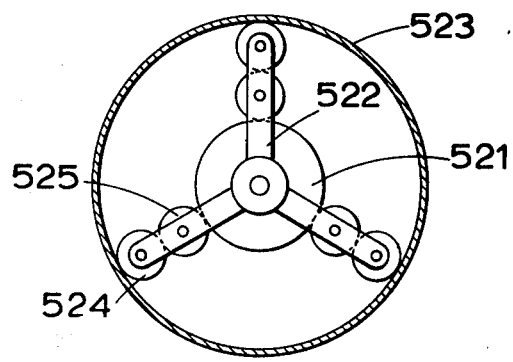

The epicyclic gear 13 of the gear 11 comprises a sun gear 521, a planet carrier 522 and a gear ring 523. The planet carrier 522 carries pairs of planet gears 524, 525 which provide a non-reversing drive through the epicyclic gear 13. (This arrangement of the epicyclic gear 13 is also shown in FIG. 5a). There are provided in conjunction with the epicyclic gear 13 three clutches 526, 527 and 528 and a brake clutch 529 all of which are fluid pressure operated for engagement. Fluid pressure connections 530 to 533 introduce fluid pressure to these clutches, respectively.

The output drive member 515 is permanently connected to the planet carrier 522 by a member 534. The input shaft 10, carrying the input drive members 513 and 514, can be coupled to a shaft 535, to which the sun gear 521 is secured, by the clutch 526. The clutch 528 can couple the sun gear shaft 535 to the output shaft 14 of the continuously variable gear, and the clutch 527 can couple the ring gear 523 to this output shaft 14. The brake clutch 529 can brake the ring gear 523. The epicyclic gear 13 has an overall gear reduction of about +2 with the planet carrier 522 fixed. This arrangement of the epicyclic gear and clutches is shown more clearly in diagrammatic form in FIG. 5b and 5c to which reference will now be made.

Figure 5B:
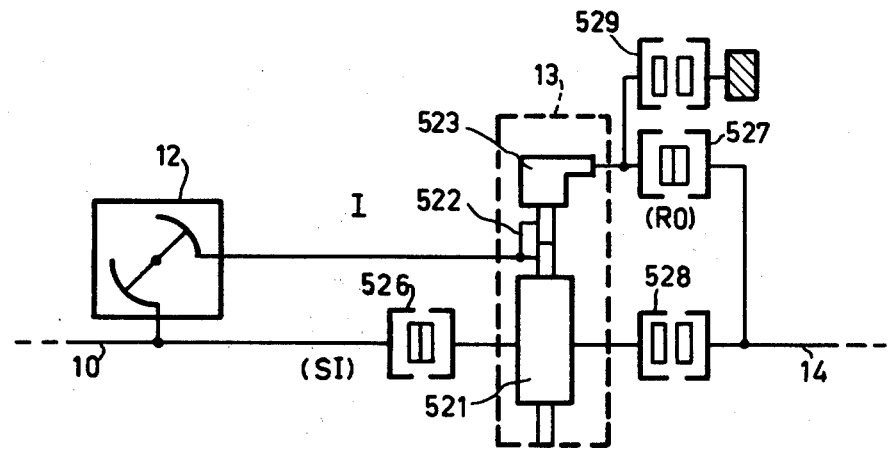
FIG. 5d is a graph showing gear ratios of the continuously variable gear.
Figure 5C:
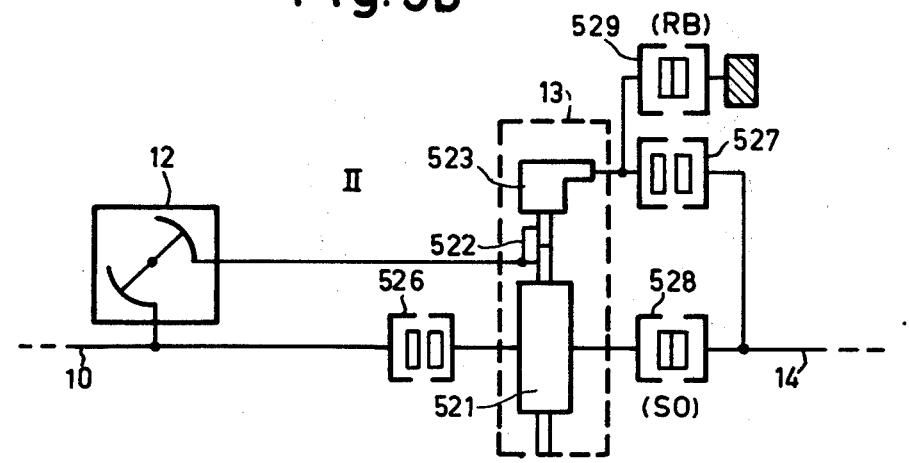

Two different modes I and II of operation of the continuously variable gear are shown in FIGS. 5b and 5c, respectively. In the mode I shown in FIG. 5b, the clutches 526 and 527 are engaged so that the input shaft 10 is connected to the sun gear 521 (SI) and the output shaft 14 is connected to the ring gear 523 (RO). The clutches 528 and 529 are disengaged. With an epicyclic ratio of +2 and within a range of 0.25-1.5 gear ratio across the rolling assembly 12, the overall gear ratio of the continuously variable gear 11 in this mode I will change from a 0.33 forward ratio at the rolling assembly gear ratio of 0.33, through zero at unity ratio in the rolling assembly, to a maximum reverse ratio of 0.25 at the rolling assembly gear ratio of 1.5. This mode I is therefore suitable for starting and reversing.

The range of overall forward gear ratios is extended in the mode II, shown in FIG. 5c, in which clutches 527 and 526 are disengaged and clutches 528 and 529 are engaged. The output shaft 14 is now connected to the sun gear 521 (SO) and the ring gear 523 is braked (RB). In this mode II, the epicyclic gear is functioning as a reverse gear of unity ratio, so that the overall gear ratio of the continuously variable gear will now change from a 0.33 forward ratio to a 1.5 forward ratio as the rolling assembly changes through the same ratio range. Thus, a synchronous gear change can be made by changing between modes I and II at a rolling assembly ratio of 0.33 when the two modes give the same overall gear ratio.

Figure 5D:
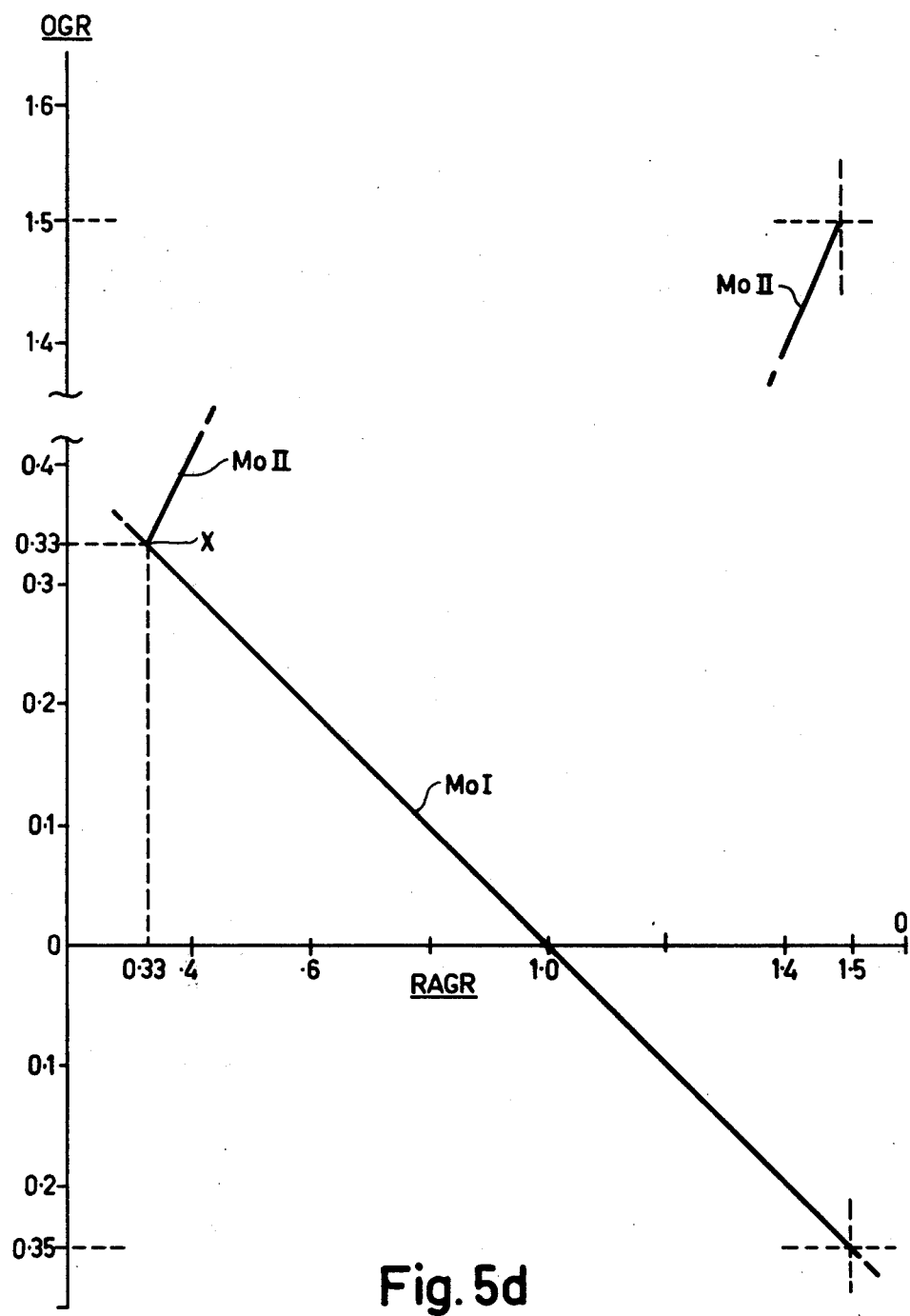

FIG. 5d shows graphically, the relationship between the overall gear ratio OGR and the rolling assembly gear ratio RAGR. The straight line Mo I shows relationship in mode I and the straight line Mo II shows the relationship in mode II. Overall gear ratios OGR below the O—O axis are reverse ratios and those above this axis are forward ratios. Point X is the change point between modes I and II at the rolling assembly ratio of 0.33.

4. Hydraulic Control System

Figure 6:
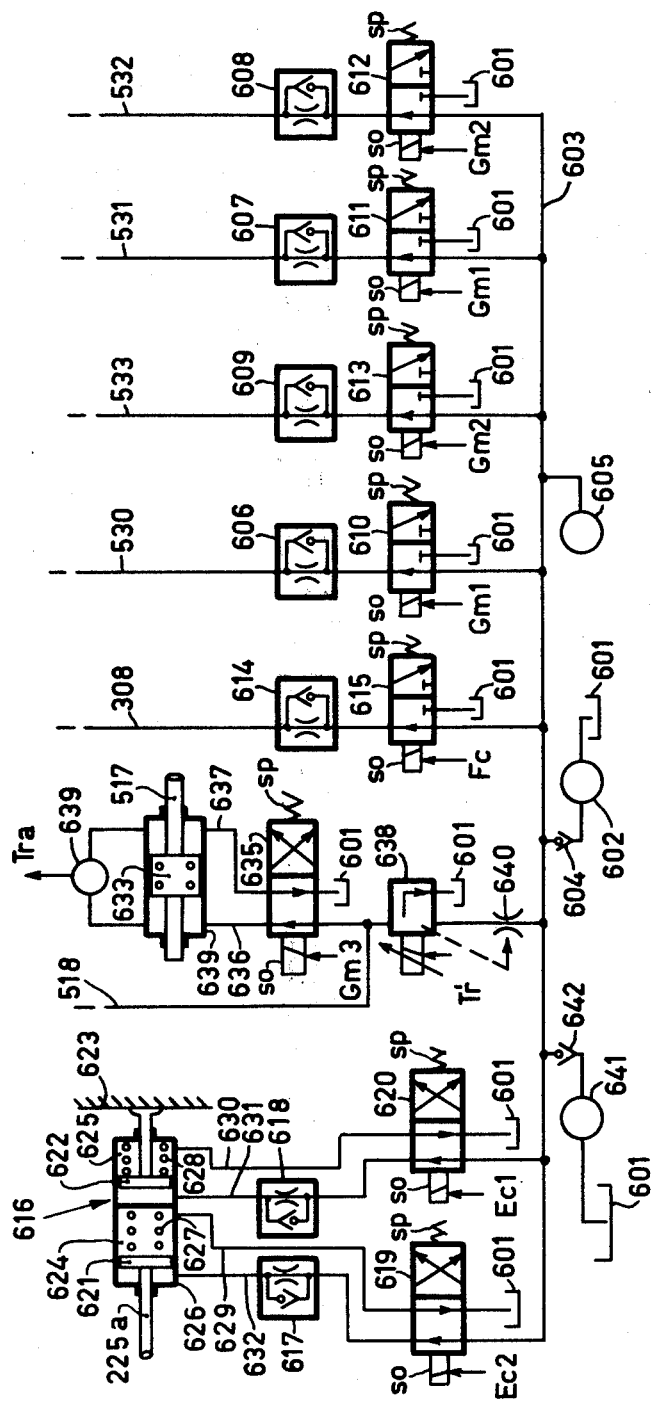
FIG. 6 is a schematic diagram of a fluid pressure system for the arrangement of FIG. 1.

An electromagnetically controlled hydraulic pressure system for the propulsion arrangement of FIG. 1 is shown diagrammatically in FIG. 6. This system comprises a fluid reservoir 601 from which fluid pressure is developed by a pump 602 and fed to a fluid pressure line 603 through a one-way valve 604. The pump 602 is suitably mechanically driven (in a conventional manner not shown) from the input shaft 10 to the continuously variable gear 11. A pressure accumulator 605 connected to the pressure line 603 stores a residual fluid pressure which is for use when the propulsion arrangement is initially brought into use. The fluid pressure in the line 603 is used selectively by the selective energisation of solenoid valves to control all the clutches and the gear ratio of the rolling assembly of the propulsion arrangement.

More specifically, the fluid connections 530 to 533 for the four epicyclic clutches are fed with fluid pressure from the pressure line 603 through respective flow regulating valves 606 to 609 and respective solenoid valves 610 to 613. Each of these solenoid valves is normally closed by the force of a spring sp, and is opened by energisation of its solenoid so. A control signal Gm1 energises the two valves 610 and 611 to engage the mode I clutches 526 and 527 and a control signal Gm2 energises the two valves 612 and 613 to energise the mode II clutches 528 and 529. Similarly, the fluid connection 308 (FIG. 3) for the flywheel clutch is fed with fluid pressure from the pressure line 603 through a limiting valve 614 and a solenoid valve 615 which is normally closed by the force of a spring sp, and is opened by energisation of its solenoid so by a control signal Fc to engage the flywheel clutch. For operating the linkage 225 (FIG. 2) of the engine clutch there is provided a tendem jack device 616 which is fed selectively with fluid pressure through flow regulating valves 617 and 618 and two further solenoid valves 619 and 620. The tandem jack 616 comprises two pistons 621 and 622, of which piston 621 is connected to a linkage rod 225a and piston 622 is secured to a rigid support member 623. These two pistons 621 and 622 are housed in respective fluid pressure chambers 624 and 625 which are provided in a housing 626 which is movable relative to the support member 623 in the axial direction of the linkage rod 225a. Respective springs 627 and 628 react between the pistons 621 and 622 and the housing 626. When no fluid pressure is applied to the tandem jack 616, the housing 626 is displaced to the right by the action of spring 628 (as seen in the drawing) and takes with it the piston 621 so as to cause the linkage rod 225a to move the linkage 225 into the disengaged position for the engine clutch in the no-load condition. When the fluid pressure system is operative, the unenergised (spring-loaded) position of the solenoid valves 619 and 620 allows the same fluid pressure to enter the chambers 624 and 625 through respective connections 629 and 630 so that the disengaged position for the engine clutch is not affected. To engage the engine clutch hydraulically, solenoid valve 620 is energized by a control signal Ec1 so that fluid pressure now enters chamber 625 through a fluid connection 631. As a result, the housing 626 is displaced to the left, piston 622 being fixed, and piston 621 follows it under the action of the spring 627 and the fluid pressure in the chamber 624 to cause the linkage rod 225a to move the linkage 225 to the engaged position for the engine clutch. To disengage the engine clutch hydraulically, solenoid valve 619 is energized by a control signal Ec2 so that fluid pressure now enters chamber 624 through a fluid connection 632. As a result, the piston 621 is displaced to the right by this fluid pressure against the action of the spring 627 to cause the linkage rod 255a to move the linkage 225 to the disengaged position for the engine clutch.

The torque reaction arm 517 (FIG. 5a) for the rolling assembly 12 is connected to a torque reaction piston 633 which is slidable in a fluid pressure chamber 634 into which fluid pressure can be fed selectively to either side of the piston 633 from another solenoid valve 635 through respective fluid connections 636 and 637. A control signal Gm3 energizes the solenoid valve 635 to inter-change the fluid pressure across the piston 633, the result of which is to reverse the sense of the torque produced by the torque reaction lever 517. The actual value of fluid pressure fed to the chamber 634 is determined by proportional energization of a solenoid valve 638 in accordance with the magnitude of a torque control signal T'r. A torque reaction signal Tra is provided by a pressure transducer 639 which measures the fluid pressure across the piston 633. In order to prevent the solenoid valve 638, which is in effect a fluid pressure bleed valve, from bleeding a large value of fluid pressure from the pressure line 603 when only a small valve of fluid pressure is required in the chamber 634, there is provided a variable flow regulating valve 640 which is mechanically linked to the valve 638 in such manner as to be closed when the valve 638 is fully opened to "bleed off" fluid pressure. A second pump 641 driven from the output shaft 14 (FIG. 1) is provided to produce fluid pressure under "towing" conditions. A one-way valve 642 is provided between this pump and the pressure line 603.

5. Electrical Control System

The control signals Gm1, Gm2, Gm3, Fc, Ec1, Ec2 and T'r, and also an engine throttle control signal Rt, are produced by a control circuit of the propulsion arrangement, and the signal Tra is fed to the control circuit together with further signals representative of shaft speeds, pressure on the brake pedal, the position of the accelerator pedal and control program selection. FIG. 1 to which reference is now made again, shows the overall composition of the propulsion arrangement with the derivation and utilization of these signals.

The shafts 2, 8, 10 and 14 have mounted thereon respective toothed wheels 18, 19, 20 and 21 which are rotatable therewith. Transducers 18', 19', 20' and 21' are associated respectively with the toothed wheels 18 to 21. Each toothed wheel and associated transducer co-operate to produce an electrical signal whose frequency is representative of the speed of rotation of the respective shaft. These electrical signals are applied to respective frequency-to-d.c. convertor circuits 22, 23, 24 and 25 which produce respective analog voltage speed signals, designated We, Wf, Wp and Wd, respectively, as shown. In the case of the speed signal Wf, the electrical signal from the transducer 23 is first applied to a ÷3 frequency divider circuit 23', so that the speed signal Wf is referred to the other speed signals We, Wp and Wd, this being a convenient way of taking into account the 3:1 ratio of the fixed gear 5.

The electronic control circuit of the arrangement, which is represented by the rectangle 26, has the speed signals We, Wf, Wp and Wd applied to it.

The arrangement further includes in association with an accelerator pedal 27 of the vehicle, a potentiometer 28 which produces at its tapping point 29 a voltage that varies as the accelerator pedal 27 is actuated. This voltage, after amplification by an amplifier 30, forms a control signal Ra which is indicative of the extent of actuation of the accelerator pedal 27 and which is applied to the control circuit 26. There is provided in association with a brake pedal 31 of the vehicle, a pressure transducer 32 which produces at its output 33 a voltage which varies with actuation of the brake pedal 31. This latter voltage, after amplification by an amplifier 34, forms a control signal Rb which is indicative of the extent of actuation of the brake pedal 31 and which is applied to the control circuit 26.

A throttle 35 which controls according to its position the amount of fuel-air mixture fed to the engine 1, has no direct linkage to the accelerator pedal 27 as in a conventional motor vehicle. Instead, the position of the throttle 35 is determined by a servo motor 36 through gearing 37 in response to the output from a servo amplifier 38. A potentiometer 39 has its tapping point 40 linked to the throttle 35 so as to produce a voltage which varies as the position of throttle 35 varies. This voltage forms a control signal Rtp which is indicative of the present throttle position. This control signal Rtp is applied to one input of the servo amplifier 38 to maintain the throttle setting. Change in the throttle setting is effected by a control signal Rt applied to a second input of the servo amplifier 38 from the control circuit 26.

Control Program Selector

In the preferred embodiment, four different control programs for optimizing vehicle performance under different driving conditions are provided.

The first of these is a "normal program" (N) in which the control strategy is as set forth in conditions (i) to (xvii) above. This normal program is aimed at achieving low fuel consumption but only a small (or zero) enhancement of available performance above that given by maximum engine power. A significant increase in power above maximum engine power cannot usefully be provided because the flywheel is being cycled between a charged and discharged state and may be largely discharged at the moment when maximum available power is required.

The second control program is a "power program" (P) in which the control strategy is aimed at achieving a substantial enhancement of available power while maintaining on average a low engine speed (and noise) and allowing regenerative braking even when the flywheel is fully charged. Any spare power from the engine is used to keep the flywheel well charged in readiness for any surge of power which is required. Otherwise, the engine only mode is maintained. For implementing the power program the following condition (xviii) is provided:

(xviii) when power is being demanded in the flywheel only mode to cause change to the flywheel plus engine mode. Also, in the power program, condition (xiii) is modified in that there is always change from the flywheel plus engine mode to the engine only mode, irrespective of vehicle speed, when the power being demanded from the propulsion arrangement is not above the specified value of condition (xii), and condition (xvi) is removed.

The third control program is an "extra power program" (EP) in which the control strategy is aimed at maximizing available performance. Regenerative braking is not allowed in this extra power program. The flywheel plus engine mode is used whenever possible and the flywheel is continually servoed to a maximum specified speed (above which it is over-charged) for maximum available power. For implementing the extra power program the electronic control means is responsive to inhibit operation in the flywheel only mode, and conditions (iv) and (xi) are inhibited to prevent change from the flywheel plus engine mode to the flywheel only mode. Also, condition (xiv) is inhibited so that if it is possible to charge the flywheel in accordance with condition (ix), there is change from the engine only mode to the flywheel plus engine mode.

The fourth control program is a "light load program" (LL) in which the control strategy is to use up any spare energy in the flywheel and then to remain in the engine only mode. This light load program is useful in situations where the spare flywheel energy is likely to be wasted if not used immediately, such as on a very short journey, or on approaching a long descent following which the flywheel can be used again when required by selecting one of the other control programs. For implementing the light load program condition (xvii) is modified to allow change from the engine only mode to the flywheel plus engine mode even when the flywheel is nearly discharged, condition (ix) being inhibited to prevent a change to the flywheel plus engine mode in any other circumstances. Also, condition (iii) is inhibited so that there is always change from the flywheel plus engine mode to the engine only mode by condition (ii). Further, condition (xiii) is modified to inhibit change from the flywheel plus engine mode to the engine only mode by condition (xiii), and condition (iv) is modified to force a change to the flywheel only mode, subject to condition (xii) not being satisfied.

A program selector switch 41 provides any one of six select signals according to the position 1 to 6 of its selector arm 42. One of the select signals (S) signifies a "start" or neutral position, another (R) a "reverse" position, and the remaining four (N, P, EP, and LL) signify the selection of respective control programs. These select signals are applied to the circuit 26, together with their respective inverted signals $\overline{S}$, $\overline{R}$, $\overline{N}$, $\overline{P}$, $\overline{EP}$ and $\overline{LL}$. When a select signal is at a high level its respective inverted signal is at a low level, and vice versa. A high level represents a '1' output and a low level represents a '0' output in the logic circuits to be described. Thus, if, for example, the Normal program is selected N=1 and S, R, P, EP and LL each equal '0', while $\overline{N}$=0 and $\overline{S}$, $\overline{R}$, $\overline{P}$, $\overline{EP}$ and $\overline{LL}$ each equal '1'.

The rolling assembly 12 of the continuously variable gear 11 has its gear ratio set by hydraulic pressure, as already described. The value of this hydraulic pressure is determined by the circuit 26 by means of the control signal T'r which is applied through an amplifier 43 to energize the solenoid so of the bleed valve 638 which sets the hydraulic pressure. The torque reaction signal Tra which is produced by the fluid pressure transducer 639 and which is indicative of the gear ratio setting, is applied through an amplifier 44 to the circuit 26. The control signal Gm3 from the circuit 26 is applied through an amplifier 45 to the solenoid so of the changeover valve 635 which determines the sense in which the torque applied to the rolling assembly 12 is acting.

The epicyclic gear 13 of the continuously variable gear 11 has its four electro-magnetically operable clutches 526, 527, 528 and 529 operated in pairs to set the epicyclic gear 13 to one or the other of two configurations, as aforesaid. The solenoid so of valves 610 and 611 for operating the clutches 526 and 527 are operated by the control signal Gm1 applied to them via respective amplifiers 46 and 47 and the solenoids so of valves 612 and 613 for operating clutches 528 and 529 are operated by the control signal Gm2 applied to them via respective amplifiers 48 and 49.

The control signal Fc for engaging the flywheel clutch 7 is applied through an amplifier 50 to energise the solenoid so of valve 615. The control signals Ec1 and Ec2 for the engine clutch 3 are applied through respective amplifiers 51 and 52 to energize the solenoids so of valves 620 and 619.

Control Strategy

Turning now to the detailed operation of the control circuit 26, as mentioned previously, there are three different modes of operation of the propulsion arrangement, namely, the engine only mode, the flywheel only mode and the flywheel plus engine mode. For the sake of convenience hereinafter, these modes will be referred to, respectively, as the E mode, the F mode and the F+E mode. The conditions defining when a change in mode (e.g. F+E→F) is to be made are different for the several control programs. Each mode change point is at a particular target flywheel speed, which is made a function of the control programs selected having regard to the different control strategies to be implemented by the control circuit for the several control programs. Each mode change point is also made a function of the power (positive or negative) demanded by a driver, as determined by the actuation of the vehicle accelerator pedal and brake pedal, so that it will be less arbitrary in that the driver will be given some direct control of it as he varies his power demand. Each mode change point is further made a function of vehicle speed, so that as vehicle speed falls a lower engine speed is possible, which would seem more natural. Also, a given amount of energy in the flywheel could be used for longer.

Hysteresis has been built-into the control to ensure that a mode change cannot be followed immediately by a reverse change.

In each control program the decisions of the control circuit have to be specified in each mode even though a mode may not normally arise within that program. This is because the driver may have changed to that program while that mode prevails.

The different control program which can be selected are, as aforesaid, the Normal Program (N) in which the engine is either being used at fairly high power or not at all (idling or stalled), the Power Program (P) in which the engine is being used most of the time and the flywheel is kept as near as possible to a predetermined maximum speed, an Extra Power Program (EP) which resembles the Power Program but in which the flywheel is at all times brought close to its maximum speed, and a Light Load Program (LL) in which the flywheel is not used once any spare energy in it has been spent.

However, before considering in detail the overall control strategy involving the different control programs, reference will first be made to the flow chart of FIG. 7 which shows only basic strategies sufficient for a simple realisation of the invention when a vehicle is in motion.

Figure 7:
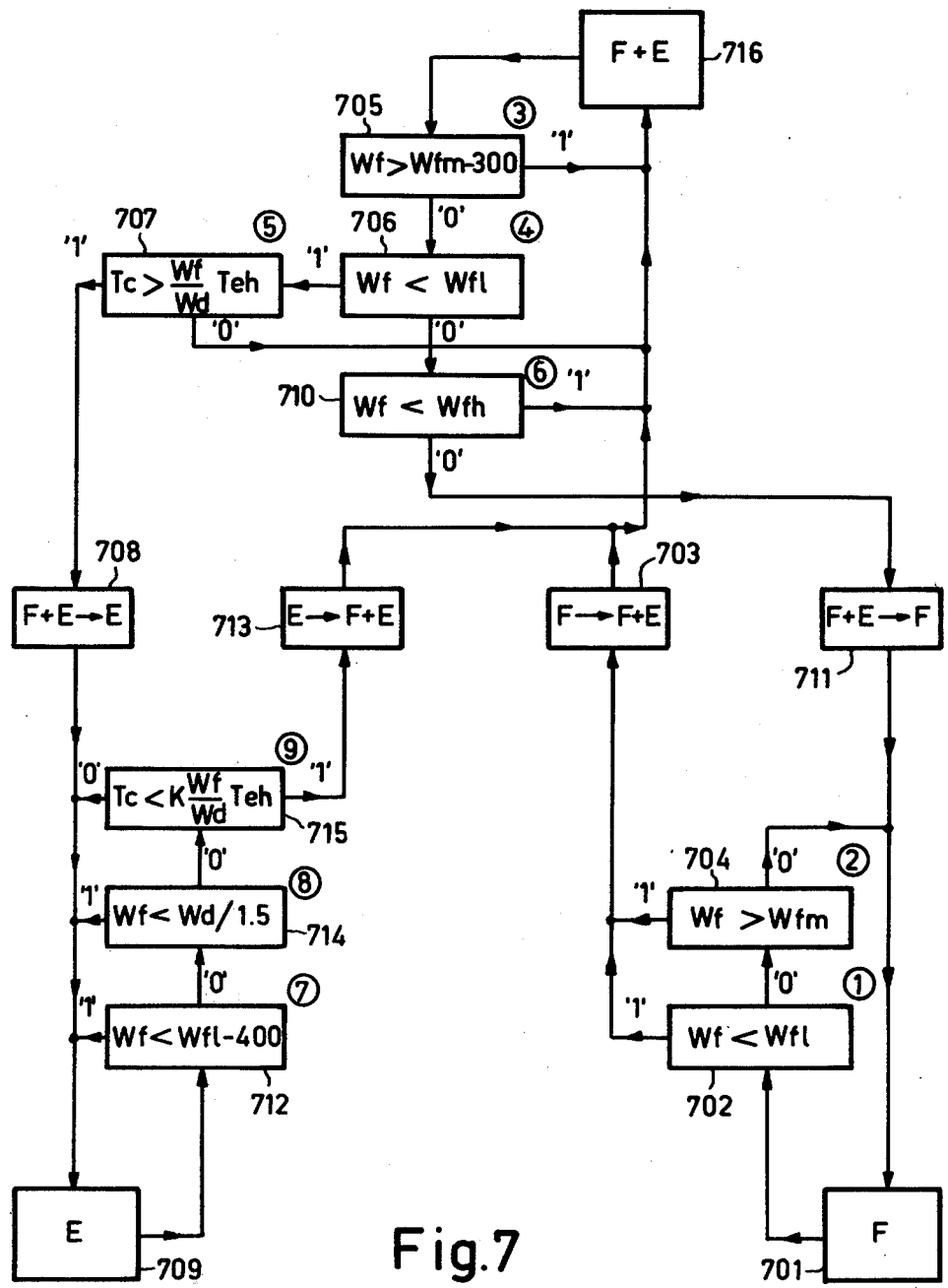
FIGS. 7 and 8 are flow charts of control strategies for effecting mode changes within the propulsion arrangement of FIG. 1.

In the flow chart of FIG. 7, the various logic boxes have the significances given therein. The '1' output from each logic box signifies a "YES" answer and '0' output from each logic box signifies a "NO" answer. The underlying control strategy depicted in the flow chart is to use the engine near its region of minimum specific fuel consumption in the F+E mode and when the flywheel has become charged to change to the F mode, the cycle being repeated when the flywheel is discharged. However, various qualifying conditions have to be considered and the need for all these conditions and the decisions arising from them is best understood by assuming that the arrangement is initially in the F mode as represented by the box 701.

Condition 1 ($Wf < Wfl$) shown in the logic box 702 determines whether or not the flywheel speed $Wf$ has reached its low speed $Wfl$, a speed at which it is regarded as discharged. Since the engine is then used to accelerate the flywheel from this low speed to its high speed $Wfh$, a speed at which it is regarded as charged, the value of $Wfl$ is chosen to correspond to an engine speed below that giving the minimum specific fuel consumption. However, at high road speeds, the limited range of gearing provided by the continuously variable gear can require the value of $Wfl$ to be increased. If there is a '1' output from logic box 702, the engine clutch is engaged to effect the transition F→F+E as represented by the box 703 so that the arrangement is then in the F+E mode. If there is a '0' output from logic box 702, the F mode is maintained, subject to condition 2.

Condition 2 ($Wf > Wfm$) shown in the logic box 704 determines whether or not $Wf$ is greater than $Wfm$ which is the maximum nominal speed of the flywheel. This condition is a safety check to prevent over-speeding the flywheel during prolonged regenerative braking on long descents. If there is a '1' output from logic box 704, the engine clutch is engaged to effect the transition F→F+E so as to use engine braking to retard the vehicle and flywheel. If there is a '0' output from logic box 704, the F mode is maintained.

If either condition 1 or 2 has caused a transition to the F+E mode, as represented by the box 716, condition 3 ($Wf > Wfm - 300$) shown in the logic box 705 determines whether or not $Wf$ is (still) close to $Wfm$. If it is there is a '1' output from logic box 705 and the F+E mode is maintained. The $-300$ term of condition 3 provides hysteresis preventing an immediate transition back to the F mode, as would occur if $Wf$ were compared only with $Wfm$ in condition 3. If there is a '0' output from logic box 705, conditions 4 and 5 are checked. Condition 4 ($Wf < Wfl$) shown in the logic box 706 determines whether ('1' output) or not ('0' output) the flywheel is discharged and condition 5 ($Tc > [Wf/Wd]Teh$) shown in the logic box 707 determines, with the flywheel discharged, whether ('1' output) or not ('0' output) its speed would fall further if the F+E mode is maintained. A '0' output from condition 4 maintains the F+E mode, subject to condition 6. Condition 5 is added to condition 4 to allow the F+E mode to be maintained ('0' output), provided the engine is able to accelerate the flywheel, which is necessary after a transition from one of the other two modes with the flywheel discharged, if the flywheel is ever to be recharged. The term $Tc$ in condition 5 represents, in terms of torque, the power being demanded from the propulsion arrangement to propel the vehicle. The derivation of this term $Tc$ will be described later. The term $Teh$ in condition 5 represents the highest torque that should be provided by the engine, $Teh$ being close to the maximum possible engine torque. The product of $Teh$ and $Wf/Wd$ represents the drive shaft torque that can be provided by the engine at its high torque value $Teh$ at the prevailing flywheel (and thus engine) speed. Therefore, if there is a '1' output from logic box 707, the flywheel clutch is disengaged to effect the transition F+E→E as represented by the box 708, so that the arrangement is then in the E mode as represented by the box 709. Without this transition the flywheel (and engine) speed would tend to fall further and on an ascent the engine would eventually stall. This transition thus allows the engine to be speeded up to deliver more power. Condition 5 can alternatively be in terms of the flywheel acceleration (i.e. $\Delta Wf/\Delta t < 0$) to give the required information directly.

Condition 6 ($Wf < Wfh$) shown in the logic box 710 determines whether or not the flywheel has reached its high speed $Wfh$. This condition implements the underlying control strategy in that the '1' output from logic box 710 maintains the F+E mode until the flywheel is charged. If the flywheel is charged, so that the '0' output is produced from logic box 710, the engine clutch is disengaged to effect the transition F+E→F as represented by the box 711. Wfh may be rather higher than the engine speed giving minimum specific fuel consumption, being for instance approximately equal to 2 Wfl, which would allow 75% of the flywheel energy to be used in the F mode.

Assuming that the transition F+E→E has been made, so that the arrangement is in the E mode, condition 7 (Wf<Wfl−400) shown in the logic box 712 determines whether or not the flywheel could be re-engaged (synchronously) without the engine speed having to be too low for acceptable smoothness. The limiting engine speed is taken as 1200 r.p.m. If there is a '1' output from logic box 712, the E mode is maintained. A '0' output from logic box 712 will result in the transition E→F+E as represented by the box 713, subject to conditions 8 and 9. Condition 8 (Wf<Wd/1.5) shown in the logic box 714, determines whether or not the flywheel at its subsisting speed could be re-engaged (synchronously) having regard to the prevailing vehicle drive shaft speed Wd and the highest available gear ratio (1.5) of the continuously variable gear. A '1' output from logic box 714 maintains the E mode, while a '0' output will cause the transition E→F+E, subject to condition 9. Condition 9 (Tc<k.Wf/Wd. Teh) shown in the logic box 715, is the inverse of condition 5 in logic box 707. By choosing k<1 (e.g. 0.8) this condition 9 checks that the flywheel would speed up in the F+E mode, so that if there is a '1' output from logic box 715 the flywheel clutch is engaged to effect the transition E→F+E. A '0' output from logic box 715 maintains the E mode.

Figure 9:
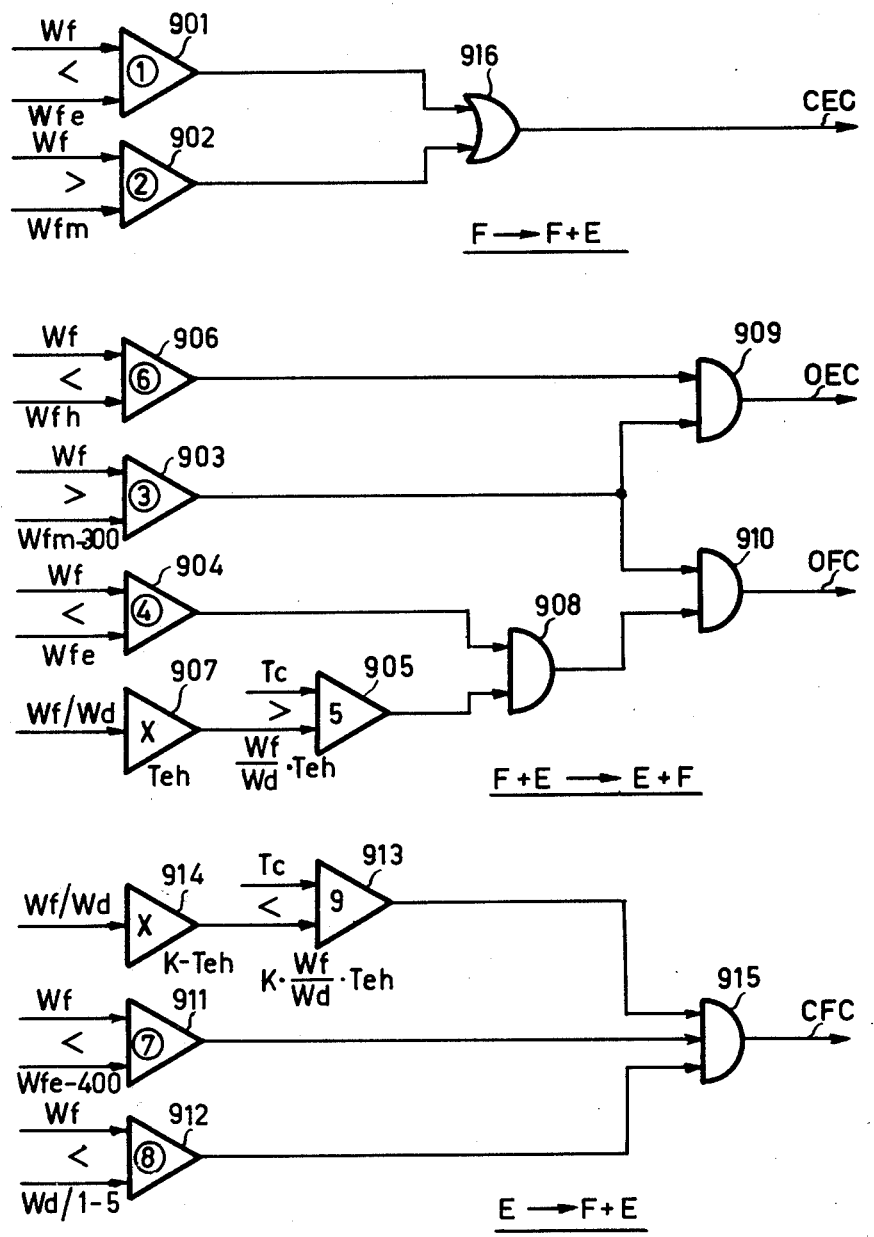
FIG. 9 is a schematic diagram of an electronic control circuit for implementing the control strategy of the flow chart of FIG. 7.

The simple control strategy represented by the flow chart of FIG. 7 can be implemented by the logic circuit of FIG. 9. This logic circuit is divided into three sections for implementing the transitions F→F+E, F+E→E or F, and E→F+E, respectively. The first section comprises two comparators 901 and 902 and an OR-gate 916. Comparator 901 determines condition 1 (Wf<Wfl) and comparator 902 determines condition 2 (Wf>Wfm). A '1' output from either comparator, if the respective condition is satisfied, is fed via the OR-gate 916 as a "close engine clutch" enable signal CEC. The second section comprises four comparators 903 to 906, a multiplier 907, and three AND-gates 908, 909 and 910. Comparator 903 determines condition 3 (Wf>Wfm−300) to produce an inverted '1' output if the condition is not satisfied. Comparator 904 determines condition 4 (Wf<Wfl) to produce a '1' output if the condition is satisfied. The output from comparator 904 is gated by AND-gate 908 with the output from comparator 905 which determines condition 5 (Tc>Wf/Wd. Teh).

The term Wf/Wd. Teh is produced by applying a signal representative of Wf/Wd to the multiplier 907 which has an amplification factor Teh. Comparator 906 determines condition 6 (Wf<Wfh). The AND-gate 909 produces an "open engine clutch" enable signal OEC in response to the inverted '1' output from comparator 903 and an inverted '1' output from comparator 906 when both conditions 3 and 6 are not satisfied. The AND-gate 910 produces an "open flywheel clutch" enable signal OFC in response to the inverted '1' output from comparator 903 and an output from AND-gate 908 which opens in response to '1' outputs from comparators 904 and 905 when conditions 4 and 5 are satisfied. The third section comprises three comparators 911, 912 and 913, a multiplier 914 and an AND-gate 915. The comparator 911 determines condition 7 (Wf<Wfl−400), the comparator 912 determines condition 8 (Wf<Wd/1.5) and the comparator 913 determines condition 9 (Tc<k.Wf/Wd. Teh). The term kWf/Wd. Teh is produced by applying a signal representative of Wf/Wd to the multiplier 914 which has an amplification factor k.Teh. The AND-gate 915 produces a "close flywheel clutch" enable signal CFC in response to an inverted '1' output from each of comparators 911 and 912 and a '1' output from comparator 913.

Figure 8:
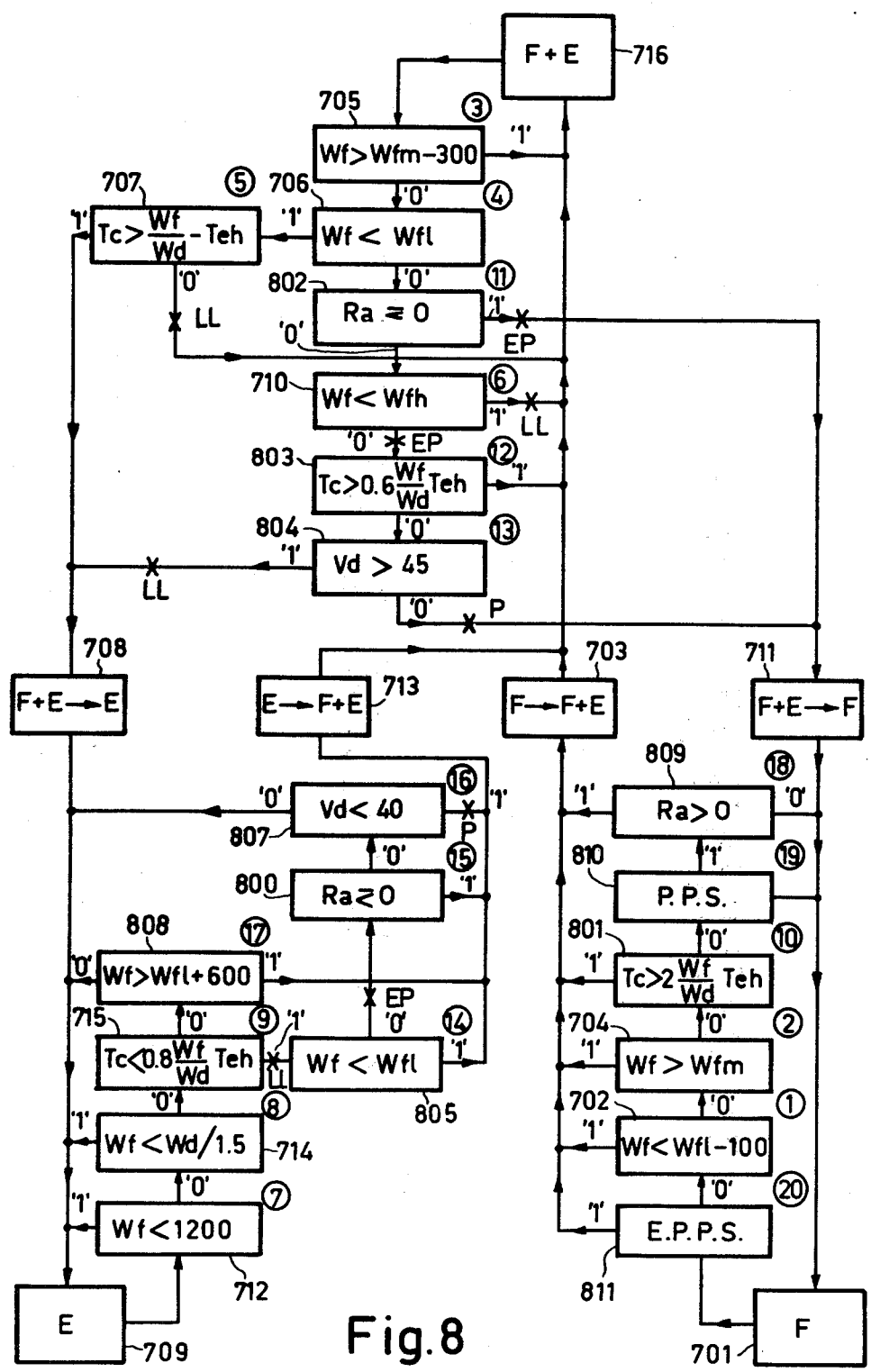

The control strategy can be greatly improved by adding further conditions governing the mode changes as shown in the flow chart of FIG. 8. Further improvement can be obtained by using the different control programs, in which certain different conditions are imposed, to provide an overall control strategy, this also being shown in FIG. 8. All the conditions shown relate to the Normal Program (N). The conditions which are not used in certain programs are indicated by disallowed routes X and the appertaining control program letter P, EP, or LL.

Consider first the Normal Program (N), all the previous conditions 1 to 9 shown in FIG. 7 being used, although some are modified and additional conditions 10 to 17 are imposed. Assuming that initially the clutches are set for the F mode, conditions 1 and 2 are unchanged, except that the term Wfl in condition 1 is changed to Wfl−100 for reasons described hereinafter. Condition 10 (Tc>2Wf/Wd. Teh) shown in the logic box 801 is added to limit the torque that the flywheel has to provide so as to avoid using undesirably strong and heavy components for the flywheel clutch. If this torque is exceeded, a '1' output from logic box 801 produces the transition F→F+E. A '0' output maintains the F mode.

In the F+E mode, the maximum torque can then be 3 Teh. The factor 3 allows full power (speed×Teh) to be obtained down to one-third of the maximum engine speed (Wem). Thus Wem/3, which is then also the flywheel speed in the F+E mode, can be used as the lower limit target value for WFl so that condition 4 can also serve to avoid exceeding the permitted flywheel torque in the F+E mode. As will be described later, it is also desirable to limit the maximum input torque applied to the variable transmission means (to be able to limit its size) and this can be achieved by making Wfl an increasing function of power demanded so that, for instance, at full power demand Wfl≧Wem/2.5. Conditions 3, 4, 5 and 6 are unchanged. Condition 11 (Ra≦0) shown in the logic box 802 is considered when Wf is above Wfl ('0' output from logic box 706), so that regenerative braking can take place immediately the accelerator pedal (27 - FIG. 1) is released without waiting for the flywheel to be charged to Wfh (condition 6). As will be described, it is convenient for Tc to have a small negative value when the accelerator pedal is not actuated. Thus a '1' output from logic box 802 produces the transition F+E→F. Not only is this more ergonomic (it gives a more natural control and feel to the vehicle), but it also increases the margin of flywheel speed (Wfm−Wf) which might otherwise be insufficient when Wf reaches Wfh to store the energy available from the vehicle, particularly on a long descent. The use of condition 11 leads to the modification of condition 1 mentioned earlier. In condition 1 the term Wfl is changed to Wfl−100 to provide hysteresis between conditions 1 and 4. Without this change, instability between conditions 1 and 4 might occur. Condition 12 (Tc>0.6 Wf/Wd. Teh) shown in the logic box 803 is added to retain the F+E mode when the torque being demanded is fairly high. The engine is operating quite efficiently with this fairly high value of torque (0.6 Teh) and, furthermore, if the F mode were used the flywheel would quickly become discharged. Condition 13 (Vd>45) shown in the logic box 804 avoids the use of the F mode at high vehicle speeds. The term Vd represents vehicle speed in m.p.h. and can be readily derived from the term Wdx×β, where β is a factor which takes into account the overall speed ratio between the vehicle drive shaft 14 and the road wheels 16 and 17 as determined by the differential gear 15 and the diameter of the road wheels. In this embodiment, β is assumed to be 20 m.p.h./1000 r.p.m, =1/50. At high vehicle speeds the engine can be used efficiently in the E mode because of the high overdrive ratio of 1:1.5 that can be provided by the continuously variable gear 11 (giving 30 m.p.h./1000 r.p.m.). If the F mode were used, the transitions would be undesirably frequent.

In the E mode conditions 7, 8 and 9 are unchanged, except that in condition 7 the term Wfl=400 is changed to 1200 to give a fixed speed against which to compare the flywheel speed Wf, and the constant k in condition 9 has been given the value 0.8 mentioned previously. Additional conditions 14 (Wf<Wfl), 15 (Ra=0), 16 (Vd<40) and 17 (Wf>WFl+600), shown respectively in the logic boxes 805 to 808, arise from condition 13 which causes the transition F+E→E even when Wf>Wfl. Condition 14 checks whether Wf−Wfl, in which case the transition E→F+E is made. Condition 15 is added to allow regenerative braking at all vehicle speeds. If Ra=0, this condition causes the transition E→F+E and the corresponding condition 11 causes the transition F+E→F to allow the regenerative braking. Condition 16 is the direct inverse of condition 13, the different values of speed in these two conditions providing hysteresis. Condition 17 determines whether or not the flywheel is sufficiently well charged to provide the high power implied by the '0' output from logic box 715. A '1' output from logic box 808 produces the transition E→F+E which is then maintained by condition 12 (or condition 6).

In the control strategy for the Power Program (P) an additional condition 18 (Ra>0) shown in the logic box 809 is added in the F mode, this condition 18 being considered by the '1' output from condition 19 (Power Program Selected - PPS) shown in the logic box 810. Condition 18 provides the inverse of condition 11 (Ra≦0), which in the Power Program is the only situation when the F mode is used because the '0' output from the logic box 804 is a disallowed route X-P. Thus, the E mode is always used once the flywheel is charged if Tc is low to produce a '0' output from the logic box 12. Also in the Power Program, the '1' output from the logic box 16 is a disallowed route X-P. This follows from the first disallowed route X-P from logic box 804.

In the control strategy for the Extra Power Program (EP), an additional condition 20 (Extra Power Program Selected - EPPS) shown in the logic box 811 is added in the F mode. A '1' output from this logic box 811 produces the transition F→F+E. This ensures an immediate change from the F mode if the Extra Power Program is selected while the system is in the F mode obtains. The F mode is not used in the Extra Power Program, even for regenerative braking. Thus, there the '1' output from the logic box 802 is a disallowed route X-EP. The '0' output from the logic box 710 is also a disallowed route X-EP so that the F+E mode is maintained even when the flywheel is charged. Wfh of condition 6 equals Wfm in the Extra Power Program. This value for Wfh does not affect condition 6 because the '0' output from its logic box 710 is a disallowed route X-EP anyway, but Wfh=Wfm does have relevance in setting the throttle in the Extra Power Program, as will be described. A further disallowed route X-EP is the '0' output from the logic box 805. This ensures that the F+E mode is used wherever it is possible to accelerate the flywheel as implied by condition 9.

In the control strategy for the Light Load Program (LL), condition 17 is changed to (Wf>Wfl+200) to allow flywheel energy to be used even when Wf is quite close to Wfl. This follows the philosophy of this program in allowing any spare energy in the flywheel to be used up and then to remain in the E mode. Disallowed routes X-LL in this programme are: the '1' output from the logic box 715 to ensure that the modified condition 17 is always applied, the '0' output from the logic box 707 to ensure that the E mode is always used when Wf<Wfl (that is, condition 4 applies), the '1' output from the logic box 710, so that the F+E mode is not used to re-charge the flywheel, and the '1' output from the logic box 804, because there is never a transition to the E mode unless Wf<WFl (condition 4). Although condition 6 is not allowed to maintain the F+E mode, the '1' output from the logic box 803 (condition 12) is not made a disallowed route X-LL so as to provide hysteresis for condition 10 which may have caused an F→F+E transition.

6. Detailed Circuits

Mode Switching

Figure 10A:
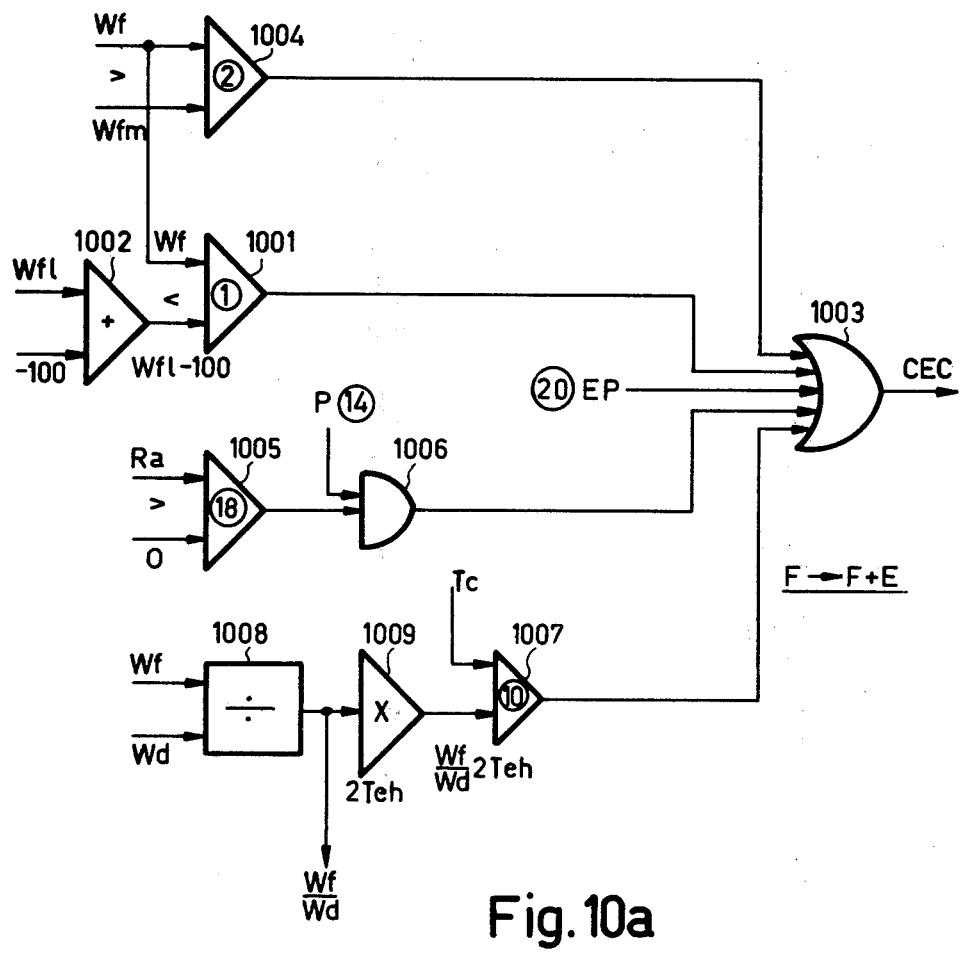
FIGS. 10a to 10c are schematic diagrams of electronic control circuits for implementing the control strategies of the flow chart of FIG. 8.
Figure 10B:
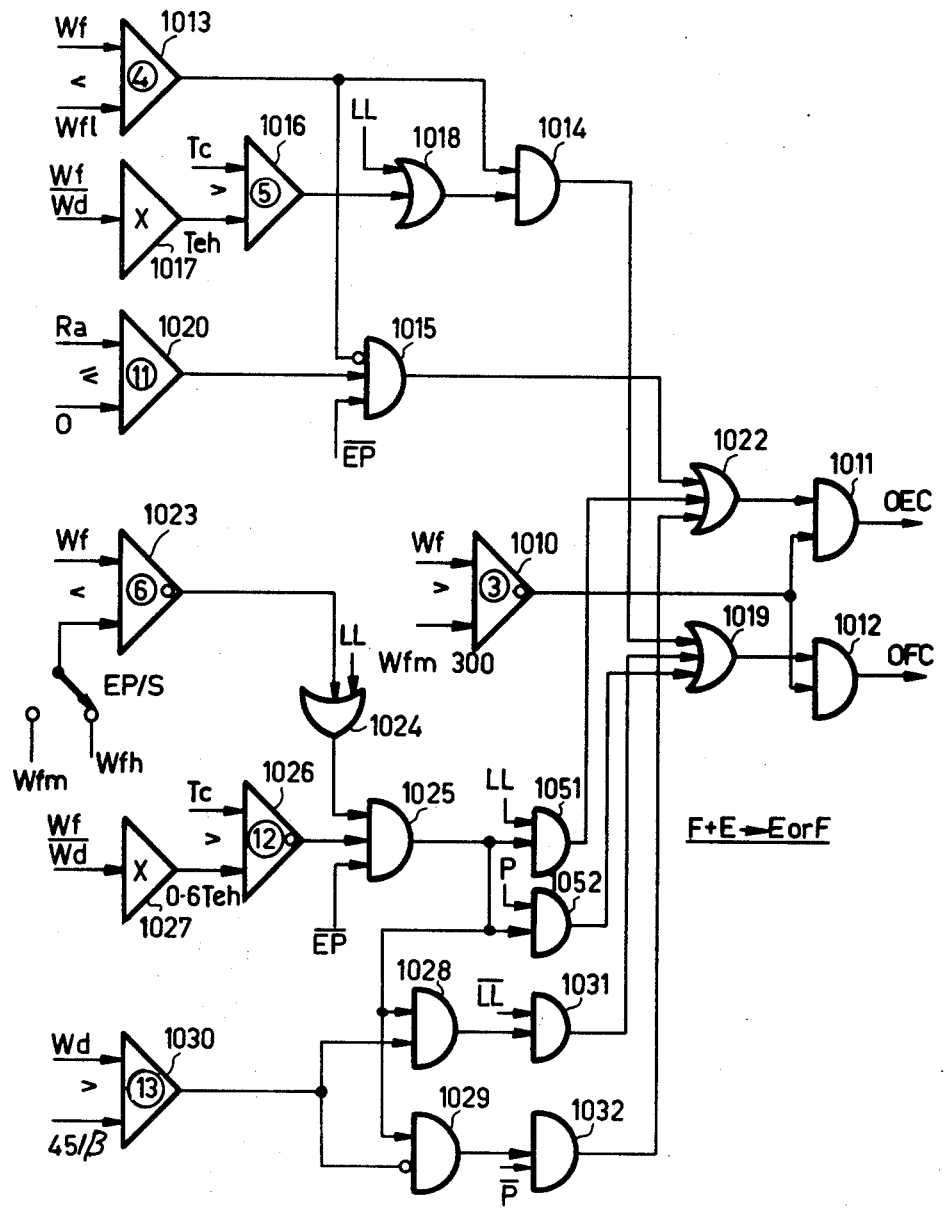
Figure 10C:
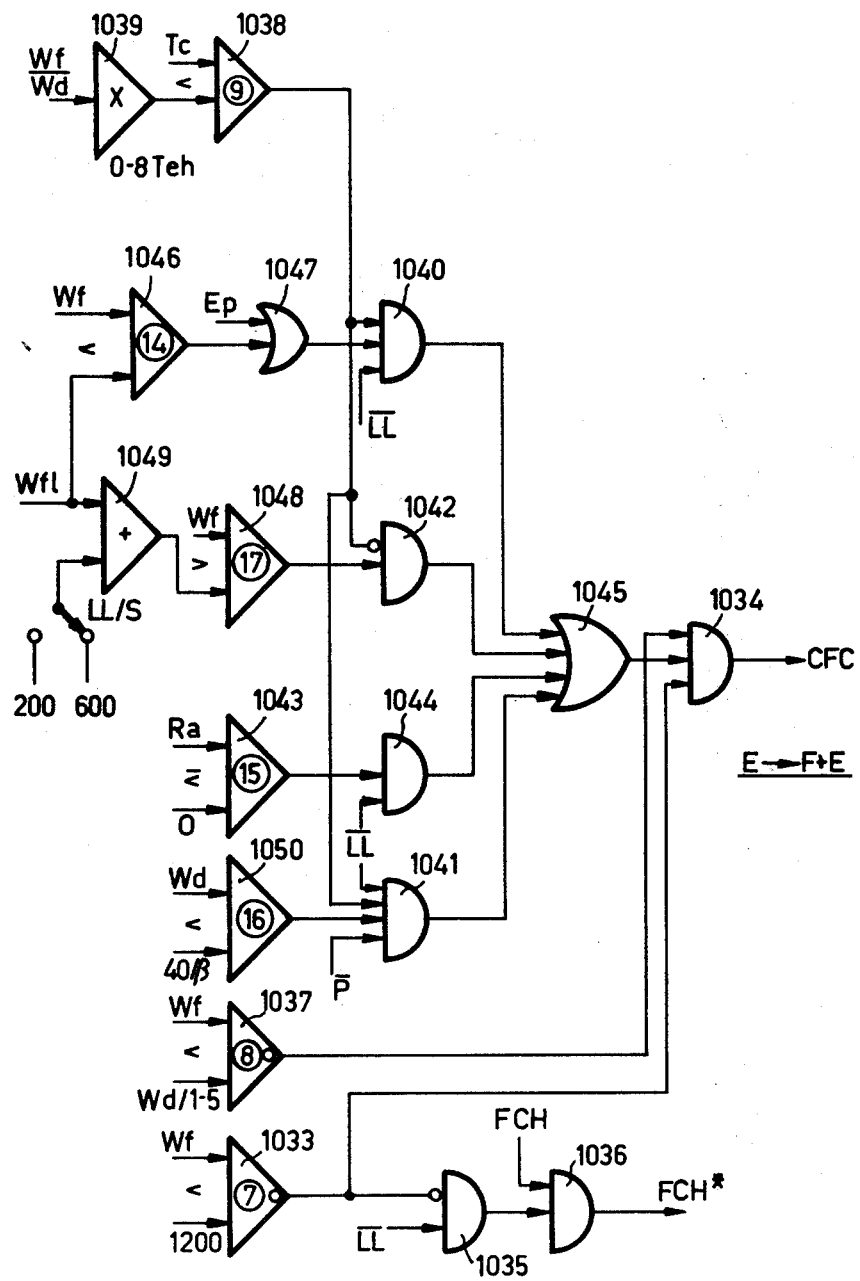

The control strategies represented by the flow chart of FIG. 8 can be implemented by the logic circuits of FIGS. 10a to 10c. The logic circuit of FIG. 10a is for implementing the transition F→F+E. A comparator 1001 determines condition 1 (Wf<Wfl−100). The term Wfl−100 is provided by an adder 1002 in response to two signals corresponding, respectively, to Wfl and −100 at its two inputs. A '1' output from the comparator 1001 will produce the "close engine clutch" enable signal CEC from an OR-gate 1003. A comparator 1004 determines condition 2 (Wf>Wfm), and a '1' output from this comparator will also produce the enable signal CEC from OR-gate 1003. A comparator 1005 determines condition 18 (Ra>0). A '1' output from this comparator is gated in an AND-gate 1006 with the power program select signal P which is effectively condition 19. An output from gate 1006 will produce the enable signal CEC from OR-gate 1003. Condition 10 (Tc>2Wf/Wd. Teh) is determined by a comparator 1007, a '1' output from which will also produce the enable signal CEC from OR-gate 1003. The term 2Wf/Wd. Teh is provided by a divider 1008 and a multiplier 1009. The divider 1008 gives a signal representative of Wf/Wd (which is also used in the other logic circuits where required) and the multiplier 1009, to which this signal is applied, has an amplification factor 2 Teh. The enable signal CEC will also be produced by the OR-gate 1003 in response to the extra power select signal EP which is effectively condition 20.

The logic circuit of FIG. 10b is for implementing the transition F+E→E or F. A comparator 1010 determines condition 3 (Wf>Wfm−300), and an inverted '1' output from this comparator serves as one input to two AND-gates 1011 and 1012 which, when open, produce the enable signals OEC and OFC, respectively. A comparator 1013 determines condition 4 (Wf<Wfl), and a '1' output from this comparator serves as one input to an AND-gate 1014. A '0' output from comparator 1013 is inverted at an AND-gate 1015 to serve as one input thereto. A comparator 1016 determines condition 5, (Tc>Wf/Wd. Teh), the signal Wf/Wd being applied to a multiplier 1017 having an amplification factor Teh to produce a signal representative of the term Wf/Wd. Teh. A '1' output from comparator 1016 is applied via an OR-gate 1018 as a second input to the AND-gate 1014. When the AND-gate 1014 is open, its output is applied via an OR-gate 1019 as a second input to the AND-gate 1012. Thus, an inverted '1' output from comparator 1010 together with '1' outputs from comparators 1013 and 1016 produce the enable signal OFC. Because the '0' output from logic box 707 (FIG. 8) is a disallowed route when the light load program is selected, the select signal LL is applied as a second input to the OR-gate 1018 so that the output '1' or '0' from comparator 1016 is ignored when the light load program is selected. A comparator 1020 determines condition 11 (Ra≦0). A '1' output from this comparator serves as a second input to the AND-gate 1015, while a '0' output is inverted at an AND-gate 1021 to serve as one input thereto. The non-select signal $\overline{EP}$ is applied as a third input to the AND-gate 1015, so that unless the extra power program is selected, AND-gate 1015 is opened in response to a '0' output from comparator 1013 and a '1' output from comparator 1020 and its output is applied via an OR-gate 1022 to serve as one input to the AND-gate 1011. A comparator 1023 determines condition 6 (Wf<Wfh). If the extra power program has been selected a switch contact EP/S is operated to replace Wfh by Wfm. This switch contact EP/S can be, for instance, a relay contact the relay of which is operated by the select signal EP. An inverted '1' output from comparator 1023 serves as one input to an OR-gate 1024 whose output serves as one input to an AND-gate 1025. The select signal LL is also applied via OR-gate 1024 to AND-gate 1025 so that if the light load program is selected the output '1' or '0' from comparator 1023 is ignored. A comparator 1026 determines condition 12 (Tc>0.6 Wf/Wd. Teh). A multiplier 1027 having an amplification factor 0.6 Teh produces a signal representative of the term 0.6 Wf/Wd. Teh in response to the signal Wf/Wd. An inverted '1' output from comparator 1026 is applied as a second input to AND-gate 1025, and the non-select signal $\overline{EP}$ is applied to this gate as a third input. Thus, unless the extra power program is selected, AND-gate 1025 is opened when conditions 6 and 12 are not satisfied (or only condition 12 of these two conditions is not satisfied with the light load programme selected), and its output serves as one input to two further AND-gates 1028 and 1029. A comparator 1030 determines condition 13 (Vd>45). The term Vd is represented by a signal 45/β so as to be compared with the signal Wd. A '1' output from comparator 1030 serves as a second input to AND-gate 1028, while a '0' output is inverted at the AND-gate 1029 to serve as a second input thereto. The outputs from AND-gates 1028 and 1029 are applied, respectively, as one input to two final AND-gates 1031 and 1032. A second input to the AND-gate 1031 is the non-select signal $\overline{LL}$. Similarly, a second input to the AND-gate 1032 is the non-select signal $\overline{P}$. Thus, with condition 3 not satisfied, so that an inverted '1' output from comparator 1010 provides one input to AND-gate 1011 and 1012, either the enable signal OFC or the enable signal OEC will be produced by the output from AND-gate 1031 and AND-gate 1032, respectively, as applied via OR-gate 1019 or 1022 as a second input to AND-gate 1012 and 1011, as the case may be. AND-gate 1031 is inhibited when the light load program is selected, and AND-gate 1032 is inhibited when the power program is selected. Two further AND-gates 1051 and 1052 each have an input from AND-gate 1025 and provide third inputs to OR-gates 1022 and 1019, respectively. A second input to the AND-gate 1051 is the select signal LL, and a second input to the AND-gate 1052 is the select signal P. The enable signal OEC is thus also produced when a '1' output from AND-gate 1025 is present and the light load program is selected, so long as condition 3 is not satisfied. Similarly, the enable signal OFC is produced when a '1' output from AND-gate 1025 is present and the power program is selected, again so long as condition 3 is not satisfied.

The logic circuit of FIG. 10c is for implementing the transition E→F+E. A comparator 1033 determines condition 7 (Wf>1200), and produces an inverted '1' output when this condition is not satisfied. This '1' output serves as a first input to an AND-gate 1034 which produces the enable signal CFC when it is opened. When condition 7 is not satisfied the inverted '0' output from comparator 1033 is applied to an inverting input of an AND-gate 1035 to which the non-select signal $\overline{LL}$ is applied as a second input. Thus, unless the light load program is selected, AND-gate 1035 opens when the flywheel is discharged. The output from AND-gate 1035 is applied as one input to a further AND-gate 1036 to which a "flywheel charge" enable signal FCH is applied as a second input. When open, the AND-gate 1036 produces a "flywheel charge" instruct signal FCH*. The derivation of the enable signal FCH and the way in which the instruct signal FCH* is used to control re-charging of the flywheel, will be described later. A comparator 1037 determines condition 8 (Wf<Wd/1.5), and produces an inverted '1' output when this condition is not satisfied. This '1' output serves as a second input to the AND-gate 1034. A comparator 1038 determines condition 9 (Tc<0.8 Wf/Wd. Teh). The term 0.8 Wf/Wd. Teh is produced by a multiplier 1039 having an amplification factor 0.8 Teh in response to the signal representative of Wf/Wd. The '1' output from comparator 1038 serves as one input to an AND-gate 1040, and as one input to an AND-gate 1041. The '0' output is applied to an inverting input of a further AND-gate 1042. A comparator 1043 determines condition 15 (Ra≦0) and produces, when this condition is satisfied, a '1' output which serves as one input to an AND-gate 1044. The output from each of the AND-gates 1040, 1041, 1042 and 1044 is applied via an OR-gate 1045 as a third input to the AND-gate 1034 which will therefore open to produce the enable signal CFC in response to any one of these outputs provided that both conditions 7 and 8 (comparators 1033 and 1037) are not satisfied. In order for AND-gate 1040 to be opened, condition 9 (comparator 1038) has to be satisfied, the non-select signal $\overline{LL}$ must be present, and either condition 14 (Wf<Wfl) must be satisfied or the select signal EP must be present. A comparator 1046 determines condition 14, the '1' output from this comparator being applied via an OR-gate 1047 to serve as a second input to the AND-gate 1040. If the select signal EP is present it is applied via OR-gate 1047 as the second input to AND-gate 1040 so that condition 14 is ignored. The non-select $\overline{LL}$ is applied as a third input to the AND-gate 1040 which will therefore not open when the light load program is selected. In order for AND-gate 1042 to be opened, condition 9 (comparator 1038) must not be satisfied and condition 17 (Wf>Wfl+600 [or +200]) has to be satisfied. Condition 17 is determined by a comparator 1048. An adder 1049 adds a component representative of 200 or 600 to the signal Wfl according as a switch contact LL/S is operated or not. This switch contact LL/S can be, for instance, a relay contact the relay of which is operated by the select signal LL. In order for AND-gate 1044 to be opened condition 15 (comparator 1043) has to be satisfied and the non-select signal $\overline{LL}$ must be present. In order for AND-gate 1041 to be opened condition 9 (comparator 1038) and condition 16 (Vd<40) have to be satisfied and both non-select signals $\overline{LL}$ and $\overline{P}$ must be present. A comparator 1050 determines condition 16 in response to the signal Wd and a signal representative of $40/\beta$.

Figure 11:
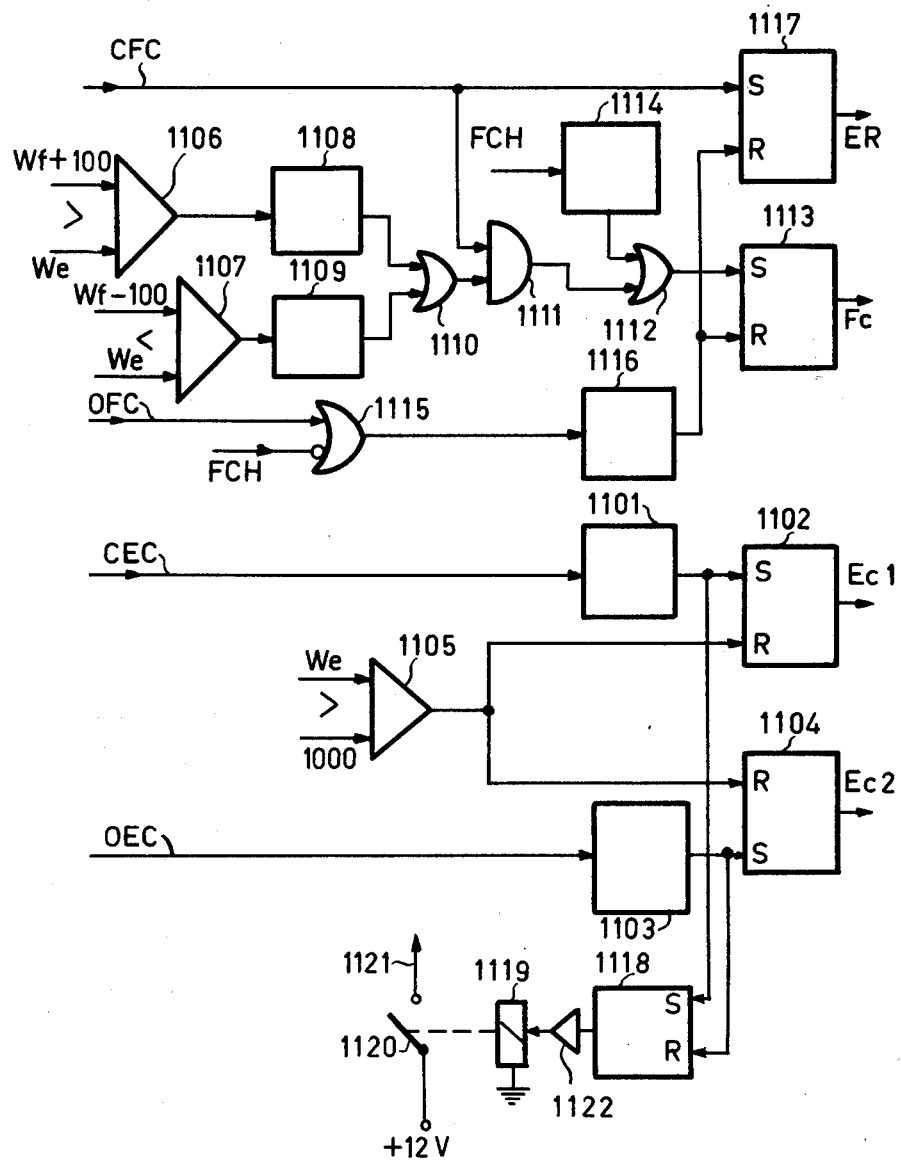
FIGS. 11 to 14 are schematic diagrams of electronic control circuits for implementing other control functions within the propulsion arrangement of FIG. 1.

A logic circuit for controlling the energization of the solenoid valves for operating the engine and flywheel clutches is shown in FIG. 11. The four enable signals CEC (close engine clutch), OEC (open engine clutch), CFC (close flywheel clutch) and OFC (open flywheel clutch) are utilized in this circuit, together with the flywheel charge instruct signal FCH*. The flywheel charge enable signal FCH is utilized in this logic circuit. The enable signal CEC is applied to a monostable element 1101 whose output sets a bistable element 1102. When set, the bistable element 1102 produces the control signal ECl to effect energization of the solenoid valve 620 (FIG. 6). Similarly, the enable signal OEC is applied to a monostable 1103 the output from which sets a bistable element 1104. When set, the bistable element 1104 produces the control signal Ec2 to effect energization of the solenoid valve 619 (FIG. 6). A comparator 1105 compares the present engine speed We with 1000 (r.p.m.) which is selected minimum engine speed at which the centrifugal action of the engine clutch becomes effective. When We>1000 a '1' output from the comparator 1105 resets the bistable element 1102 to terminate the control Ec1. When We<1000 a '0' output from the comparator 1105 is inverted to reset the bistable element 1104 to terminate the control signal Ec2. Since the engine clutch is maintained closed centrifugally once We>1000, it can only thereafter be opened by setting bistable element 1104 to produce the control signal Ec2. Conversely, when We<1000, the engine clutch can be closed by setting the bistable element 1102 to produce the control signal Ec1. The enable signals CEC and OEC are also used to control the turning-on and turning-off of the engine. An additional saving in fuel is achieved by turning-off the engine when the F mode obtains as compared with simply letting the engine idle. This control of the engine is achieved by means of an additional bistable element 1118 which is set by the output from the monostable element 1103. When set, the output from the bistable element 1118 energizes via a buffer amplifier 1122 a relay 1119 a contact 1120 of which connects the (+12v) ignition voltage for the vehicle to the ignition circuit (not shown) of the latter via a lead 1121. Thus, whenever the enable signal OEC is produced to open the engine clutch, bistable element 1118 is reset to interrupt the ignition circuit so that the engine is turned off. When the engine is to be turned on again, the enable signal CEC causes the bistable element 1118 to be set and the engine is rotated to start it, by the engagement of the engine clutch by control signal Ec1, using the flywheel.

The remainder of the logic circuit of FIG. 11 is used for the control of the flywheel clutch. Two comparators 1106 and 1107 determine, respectively, whether wf+100<We. The effect of this is to compare the present engine speed Wep with a synchronous range±100 of the flywheel speed Wf. If either condition is satisfied, a '1' output from the relevant comparator operates a monostable element 1108 or 1109, the outputs from which are applied via an OR-gate 1110 to an AND-gate 1111. If this AND-gate 1111 is at that time receiving the enable signal CFC, it produces an output which is applied via an OR-gate 1112 to set a bistable element 1113 to produce the control signal Fc for energising the solenoid valves 615 (FIG. 6). The control signal Fc is also used to operate a relay in a logic circuit which controls the engine throttle, as will be described. The bistable element 1113 can also be set by the output, applied through OR-gate 1112, from a monostable element 1114 which is operated by the active leading edge of the "flywheel charge" instruct signal FCH*. The enable signal OFC is applied via an OR-gate 1115 to operate a monostable element 1116 the output from which resets the bistable element 1113 to terminate the control signal Fc. The output from the monostable element 1116 is also used to reset a bistable element 1117 which is set by the enable signal CFC. The output ER is used to operate another relay in the logic circuit which controls the engine throttle.

The lagging edge "flywheel charge" enable signal FCH is also used to reset the bistable element 1113 to terminate the control signal Fc. This function of the enable signal FCH is represented by its application to an inverting input of the OR-gate 1115. The relationship between the signals FCH and FCH* are dealt with next in the description of the logic circuit of FIG. 12 which is otherwise mainly concerned with the selective energization of the solenoid values 610 to 613, 635 and 638 for controlling the continuously variable transmission.

Figure 12:
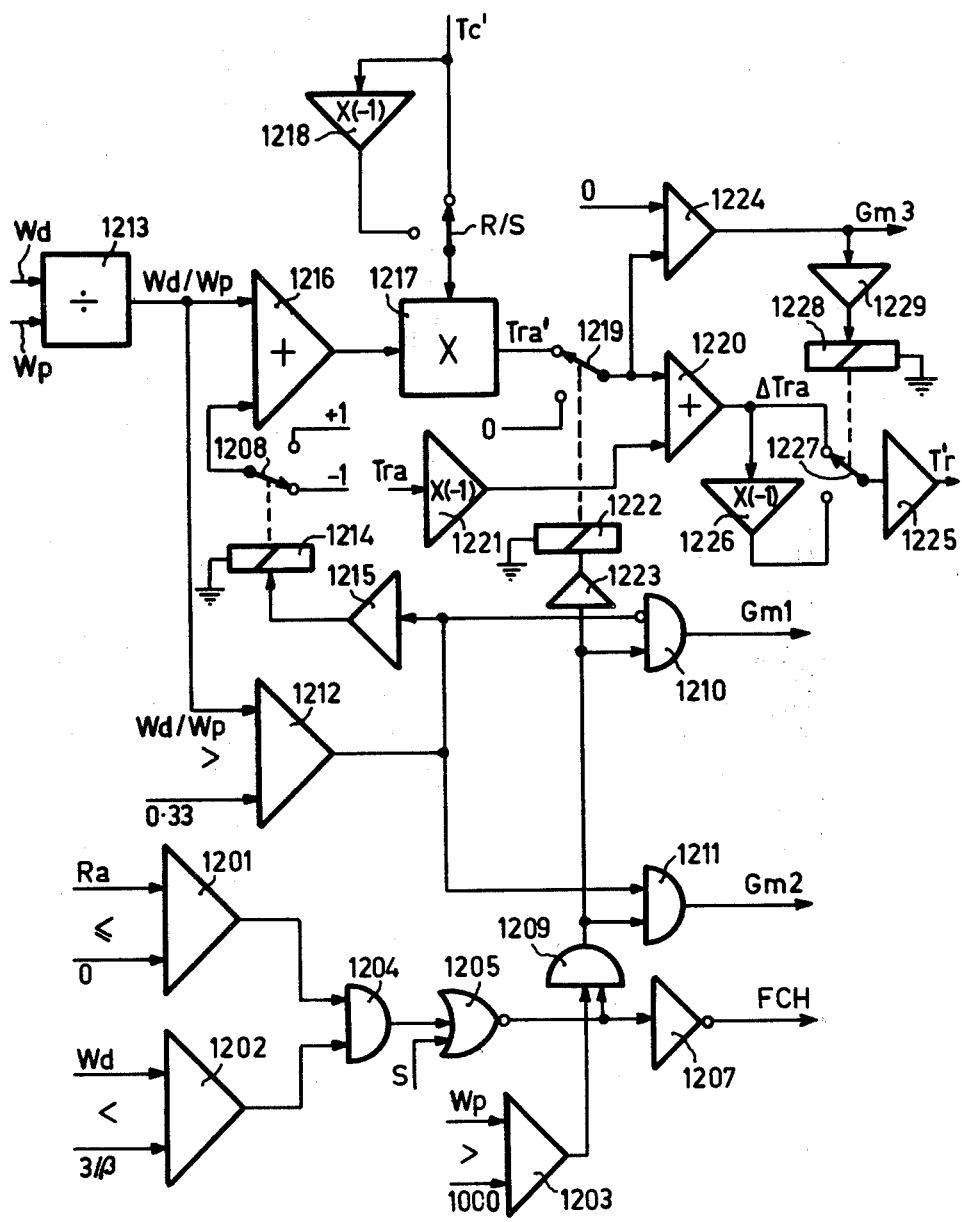

Consider first the part of the logic circuit of FIG. 12 that produces the "flywheel charge" enable signal FCH. This part comprises two comparators 1201 and 1202, an AND-gate 1204, a NOR-gate 1205 and an inverter amplifier 1207. The comparator 1201 determines whether $R_a \leq 0$ and produces a '1' output when this condition is satisfied. The comparator 1202 determines whether $Wd<3/\beta$ and produces a '1' output when this condition is satisfied. The operation is that when AND-gate 1204 is open, its '1' output is applied to an inverting input of NOR-gate 1205, and the resulting '0' output from this NOR-gate produces a '1' output from the invertor amplifier 1207 as the enable signal FCH. This produces the instruct signal FCH* (see FIG. 10c) when initial flywheel charging is to take place, the active leading edge of the instruct signal FCH* producing the control signal Fc as first described with reference to FIG. 11. This initial flywheel charging is allowed to occur whenever $Wd<3/\beta$ (i.e. a vehicle speed of less than 3 m.p.h.) as determined by the '1' output from comparator 1202 and when $R_a \leq 0$ as determined by comparator 1201, or when the arrangement is in neutral (S=1). When the arrangement is not in neutral, so that S=0, the output of NOR-gate 1205 is determined only by the output of AND-gate 1204. Thus, when the vehicle is to be moved off from rest as signified by Ra>0, the AND-gate 1204 is closed, so causing a '1' output from the NOR-gate 1205 to terminate the enable signal FCH and thus disable the flywheel charging. The lagging edge of the enable signal FCH is used to terminate the control signal Fc to open the flywheel clutch as just described with reference to FIG. 11.

A comparator 1203 determines the condition Wp>1000 and produces a '1' output when this condition is satisfied. This '1' output is gated in an AND-gate 1209 with the '1' output from the NOR-gate 1205 to produce an output which serves as a first input to two AND-gates 1210 and 1211 from which the control signals Gm1 and Gm2, respectively, are produced. This allows the epicyclic clutches for the continuously variable gear to be operated, as necessary, once Ra>0 or Wd≧3/β, and the arrangement is no longer in neutral. A comparator 1212 determines the condition Wd/Wd>0.33 and produces a '1' output when this condition is satisfied to cause the AND-gate 1211 to produce the control signal Gm2. When this condition is not satisfied the '0' output from comparator 1212 applied to an inverting input of AND-gate 1210 causes this gate to produce the control signal Gm1. The signal representative of the term Wd/Wp, which is produced by a divider 1213 in response to the signals Wd and Wp, represents the output/input speed ratio across the continuously variable gear. If Wd/Wp>0.33, then the mode II operation of the epicyclic gear becomes effective. If Wd/Wp<0.33, the mode I operation of the epicyclic gear becomes effective. Since the torque reaction (Tra) on rolling assembly of the continuously variable gear is in opposite sense in modes I and II (see FIG. 5d) the torque reaction is differently related to the drive shaft torque. For this different relationship a relay 1214 is energised by the output from a buffer amplifier 1215 when there is a '1' output from comparator 1212. A contact 1208 normally applies a signal for a term −1 (Mode I) to one input of an adder 1216 and is switched to replace this term −1 by a term +1 (Mode II) when relay 1214 is operated.

Figure 13:
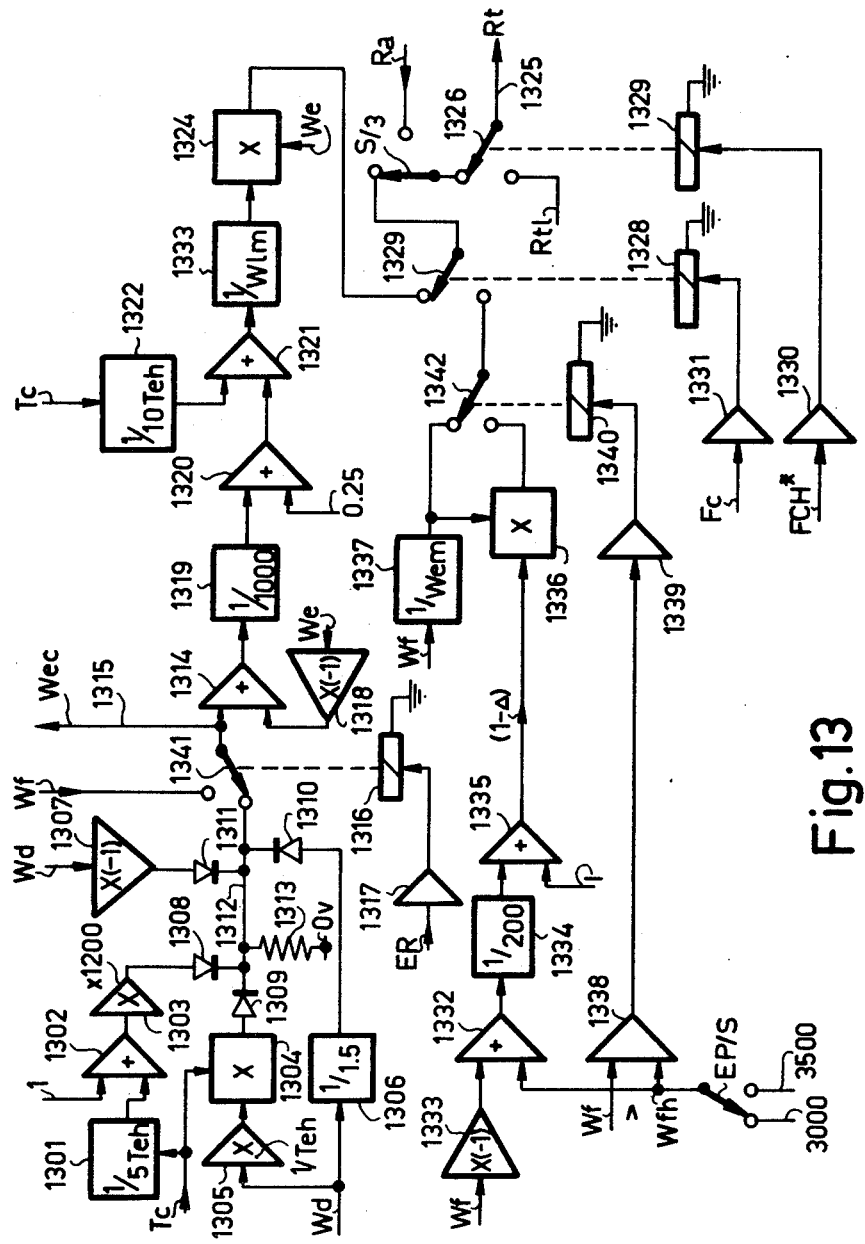

The output signal Wd/Wp from the divider 1213 is applied to a second input of the adder 1216. Thus, the output from the adder 1216 is (Wd/Wp +1) for mode II operation of the continuously variable gear and (Wd/Wp −1) for mode I operation. This output is applied to a multiplier 1217. A second input to the multiplier 1217 is a modified torque command signal Tc' which is produced by the logic circuit of FIG. 14 (to be described) in response to the torque command signal Tc. If reverse gear is selected, a switch contact R/S is operated so that a negative value of Tc' is applied to the multiplier 1217 via an amplifier 1218 having an amplification factor ×(−1). The switch contact R/S can be, for instance, a relay contact the relay of which is operated by the select signal R. The output signal from the multiplier 1217 is a control signal Tra' which is a calculated value for the torque reaction signal Tra. This control signal Tra' is applied via a relay contact 1219 to one input of an adder 1220 and the actual signal Tra is applied via an amplifier 1221 having amplification factor ×(−1) to a second input of the adder 1220. Relay contact 1219 is operated by a relay 1222 which is energized by the output from a buffer amplifier 1223. The output from AND-gate 1209 is applied to the input of the buffer amplifier 1223 so that the relay 1222 is energized except when the arrangement is in neutral or idling. For this reason, relay contact 1219 is shown in the operated position. In the unoperated position, of relay contact 1219, Tra'=0 at the appertaining input to the adder 1220. The control signal Tra' from multiplier 1217 is also applied to one input of a comparator 1224 to the other input of which a signal 0 is applied. This comparator 1224 produces the control signal Gm3 for energizing the changeover valve 635 (FIG. 6) when the torque reaction on the rolling assembly has to be reversed. This occurs when the control signal Tra' is equal to 0 or less than 0 (i.e. it has a negative value) as determined by the comparator 1224. The output signal from the adder 1220 is representative of Δ Tra and is used to drive a buffer amplifier 1225 which produces the proportional energisation control signal T'r for the solenoid valve 638 (FIG. 6). If the control signal Tra' is negative, the output signal Δ Tra is made negative by applying it to an amplifier 1226 having an amplification factor ×(−1). This is effected by a relay contact 1227 of a relay 1228 which is operated by the output from a buffer amplifier 1229 in response to the '1' output from comparator 1224, Throttle Control The logic circuit for controlling the setting of the throttle 35 (FIG. 1) is shown in FIG. 13, this logic circuit producing the control signal Rt. The logic circuit of FIG. 14 derives the torque command signal Tc from various input signals applied to it. Theoretical considerations upon which different factors used in the calculation of the torque command signal Tc and the throttle setting control signal Rt are based will first be discussed with reference to the various graphs shown in FIGS. 15 to 21, before describing FIGS. 13 and 14.

Figure 15:
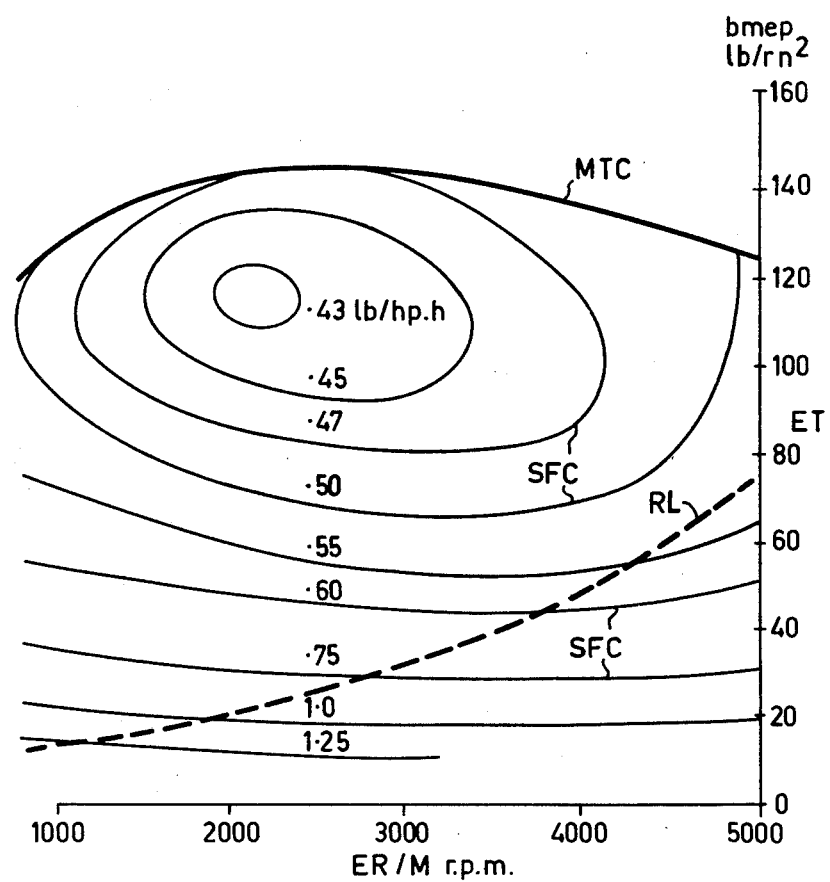
FIGS. 15 to 21 are graphs which illustrate the relationships between various parameters from which the control circuit functions are determined.

The graph shown in FIG. 15 represents the torque/speed characteristic of a 2 liter gasoline engine for a typical family sedan. The axes used for this graph are engine revolutions/minute (ER/M) and engine torque (ET) expressed in terms of brake mean effective pressure (bmep) lb/in$^2$. The line MTC represents the maximum torque at full throttle. The lines SFC, which are superimposed on the graph, represent different values of specific fuel consumption measured in pounds/horsepower, hour (lb/hp.h). The broken line RL (road load) represents the torque requirement to propel the vehicle at steady speeds on a level road using a conventional manual gear box giving a top gear corresponding to 20 mph/1000 mph at 90% transmission efficiency. It can be seen from the graph that at a steady cruising speed of, say 40 m.p.h., (i.e. an engine speed of 2000 r.p.m.) the specific fuel consumption is in the region of 1 lb/hp.h. because the torque (20 lb/in$^2$) bmep demanded from the engine is very low compared with the maximum torque which it could provide at that speed. If the engine could be used to provide a torque nearer to its maximum torque, as represented by the torque curve MTC, the fuel consumption over a period of use can be more than halved, provided that the extra torque above that need to provide the power to propel the vehicle could be used to store energy (in a flywheel) which could subsequently be used to propel the vehicle independently of the engine. Alternatively, the stored energy could be used to supplement energy from the engine, when required.

Figure 16:
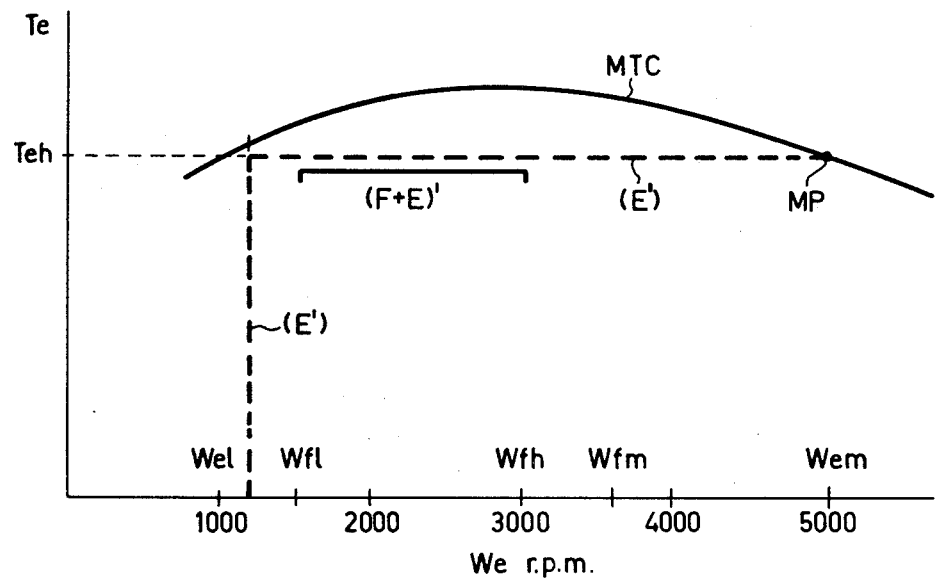

On this basis, it is advantageous when carrying the present invention into effect to run the engine near to its region of maximum efficiency all the time it is being used, for instance in its low-to-mid speed range and at around 80% full torque. This operating region for the engine is illustrated in the graph of FIG. 16 which has axes of engine torque Te against engine speed We. In this graph the maximum torque curve MTC is used as a reference to define a range of engine speeds Wel—Wem within which a high value of engine torque Teh can be provided. In this example, it is assumed that the low (for smooth running) engine speed Wel=1200 r.p.m. and that the high (or maximum) engine speed Wem=5000 r.p.m. The product Teh×Wem is the maximum power which can be obtained from the engine, this being indicated at the point MP. The dotted vertical/horizontal line E' represents the torque provided by the engine in the E mode. At the low engine speed Wel, the power from the engine can be increased by increasing the torque up to Teh, by progressively opening the throttle. Further increase in power up to the maximum engine power Teh×Wem is thereafter obtained by an increase of engine speed in response to further opening of the throttle. Within the engine speed range of, say, 1400 to 3000 r.p.m., a torque corresponding to the high value of engine torque Teh can be obtained in the F+E mode, this being indicated by the bracket line (F+E)'. This engine speed range corresponds, generally, with a selected range of flywheel speeds between the low flywheel speed Wfl and the high flywheel speed Wfh. A maximum flywheel speed Wfm of, say, 3600 r.p.m. is also indicated in FIG. 16.

Figure 17:
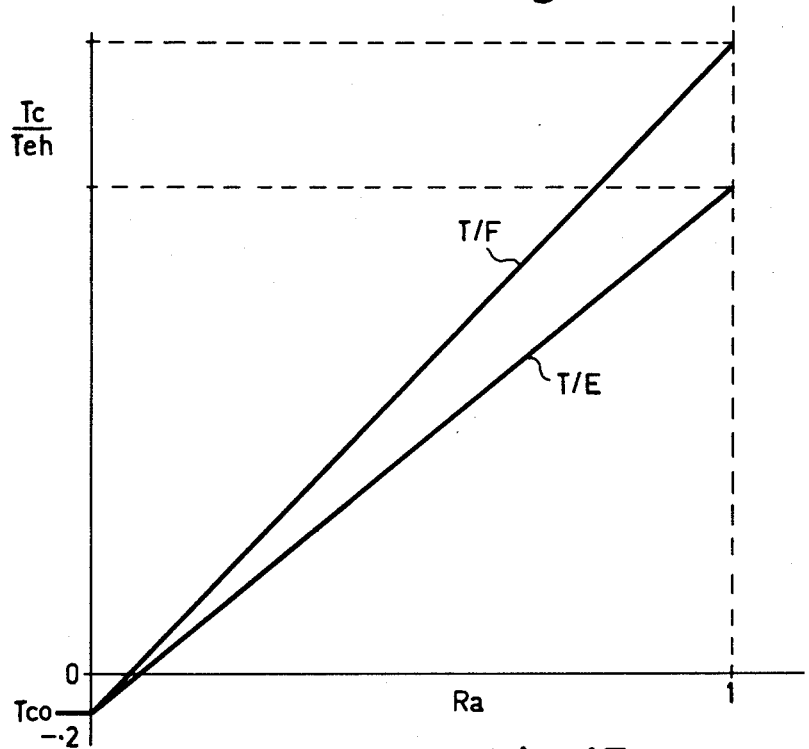
Figure 18:
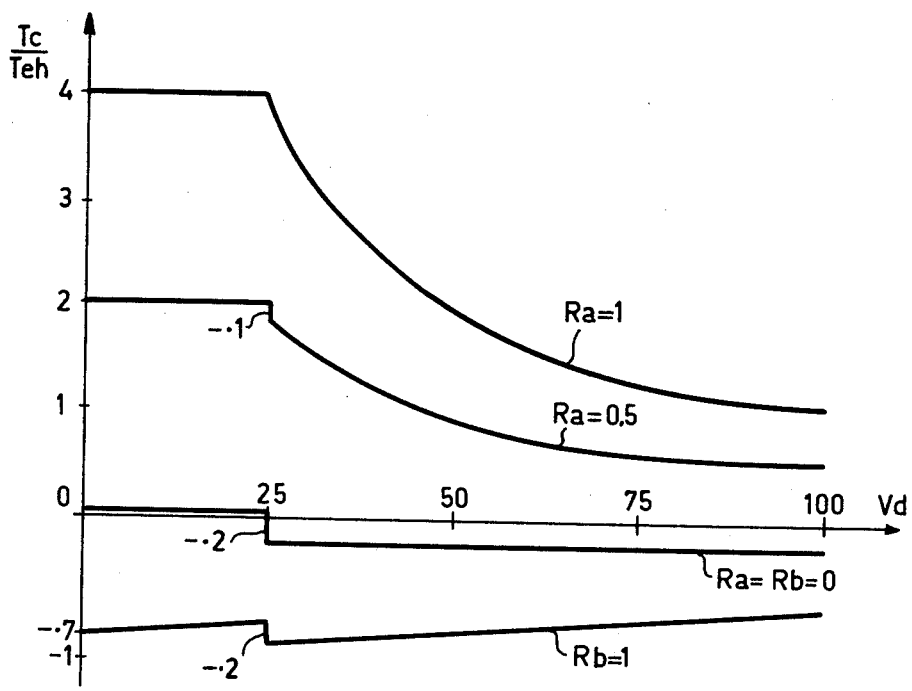
Figure 19:
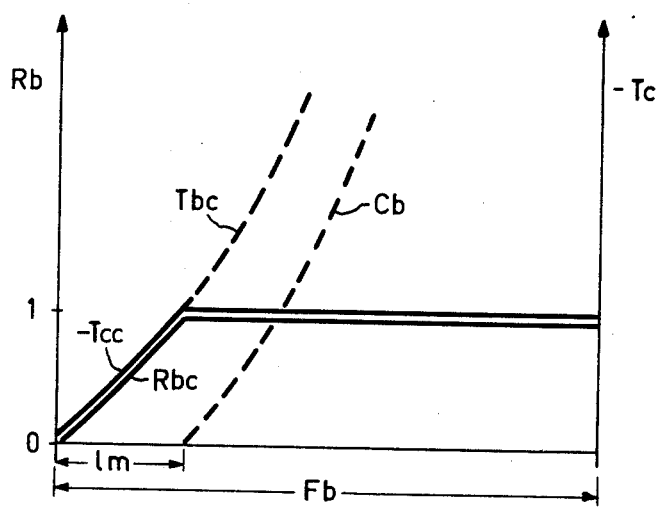
Figure 20:
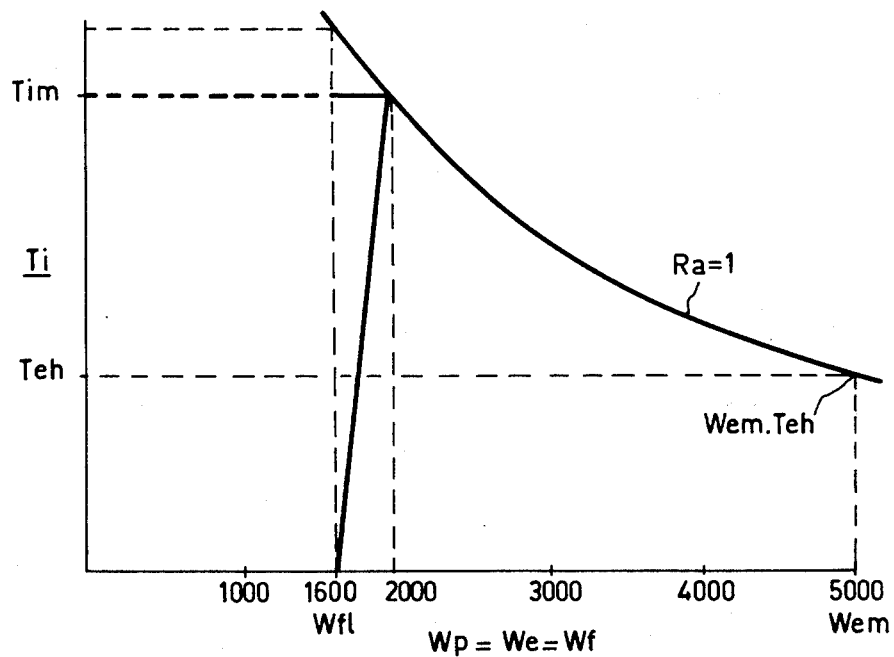
Figure 21:
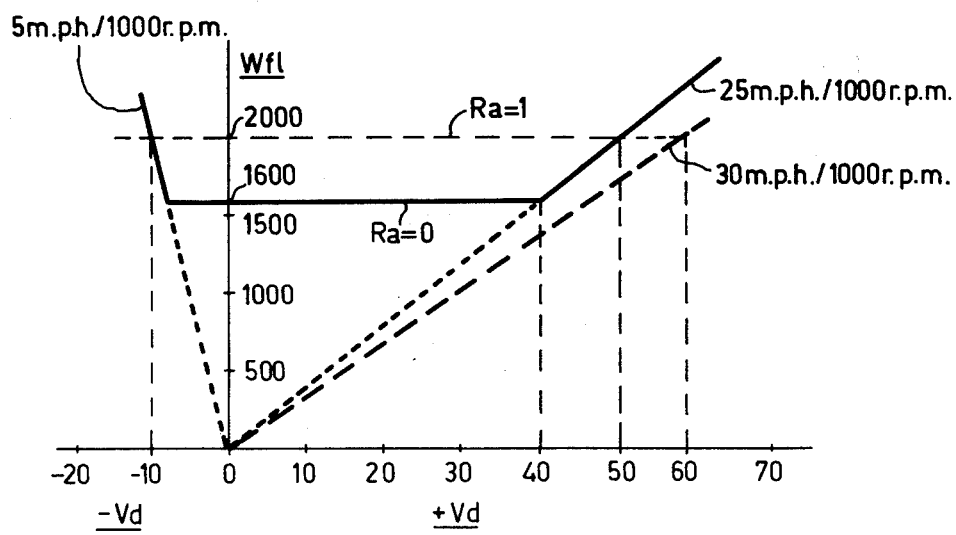

The actual value of torque Tc which is commanded from the propulsion arrangement on the vehicle drive shaft is normalized to the high value of engine torque Teh. This normalised torque Tc/Teh is commanded as a function of the extent of actuation of the accelerator pedal as represented by the value of the control signal Ra, up to a maximum value of Tc/Teh=4, which corresponds, approximately, to the maximum torque that could be obtained in first gear from a conventional manual gear box on full depression of the accelerator pedal. This torque limitation in the present instance prevents over-loading the continuously variable gear. The relationship between the torque commanded on the vehicle drive shaft and extent of actuation of the accelerator pedal is linear and is shown in the graph of FIG. 17. The line T/E represents the relationship when there is no useable flywheel energy available. The line T/F, which has a steeper slope than the line T/E, represents the relationship when there is useable flywheel energy available. The steeper slope of the line T/F implies a livelier accelerator response when useable flywheel energy is available. When Ra=0, there is a small −0.2 negative torque Tco commanded. This is to make a vehicle embodying the arrangement more ergonomic in that there will be apparent or real engine braking above a certain low road speed (e.g. 25 mph), when the accelerator pedal is unactuated as in a conventional vehicle transmission. Another relationship which aims at making a vehicle embodying the arrangement more ergonomic is that of making the value of torque commanded a function of apparent vehicle speed Wd β also, so that a particular value of Ra will command different values of commanded torque according to apparent vehicle speed. This relationship is illustrateed in FIG. 18 in which three curves Tc/Teh against Vd=βWd are shown for Ra=1, Ra=0.5 and Ra=0, respectively. Curve Ra=0.5 shows that the maximum normalized torque Tc/Teh that is commanded at low vehicle speeds is reduced proportionally according to the extent of actuation of the accelerator pedal. FIG. 18 also shows the negative value of normalized torque −Tc/Teh which can be commanded by the control signal Rb which is produced from the brake pedal. It is arranged that for values of Rb greater than 0, a proportionate negative value of normalized torque −Tc/Teh is commanded in addition to any negative torque commanded by Ra=0. This negative value is also made a decreasing function of vehicle speed so that as vehicle speed increases the value of negative torque which is commanded is progressively reduced. The curve Rb=1 represents the limit condition that obtains for maximum regenerative braking over a range of vehicle speeds. Once Rb>1, conventional braking takes place. The range of values Rb=0 to Rb=1 are arranged to occur over an initial "lost motion" part of the brake pedal pressure. The relationship between regenerative and conventional brake is illustrated in FIG. 19 in which −Tc and Rb are plotted against brake pedal pressure Fb. As shown by the curve Rbc the value of Rn increases linearly from 0 to 1 for a "lost motion" part 1m of the pressure Fb and thereafter remains steady for further pressure Fb. The curve −Tcc represents the negative torque commanded by Rb, its vehicle speed dependency being ignored in this graph for the sake of simplicity. After the "lost motion" part 1m conventional braking occurs to produce a negative torque (at the road wheels) as represented by the dotted line Cd. Therefore, the total braking effort is the sum of regenerative braking and conventional braking as represented by the dotted line Tbc.

Returning now to the logic circuit of FIG. 13, in addition to producing the control signal Rt for throttle setting, this logic circuit also produces a calculated engine speed signal Wec which should prevail for the value of the throttle control signal Rt which it produces. This signal Wec can have any one of several possible values in the E mode which are calculated as follows. The torque command signal Tc is applied to an attenuator 1301 having an attenuation factor 1/(5 Teh). The output signal from this attenuator 1301 is applied to one input of an adder 1302 to the other input of which is a signal representative of the factor 1. The output signal from the adder 1302 is applied to a multiplier 1303 having an amplification factor 1200.

The output signal from the multiplier 1303 constitutes the minimum acceptable low engine speed $Wel=1200(1+0.2[Tc/Teh])$, this being a first calculated value for Wec. The factor 0.2 Tc/Teh increases the acceptable low engine speed Wel progressively with increase in torque commanded in order to maintain smoothness of engine running. The signal Tc is also applied to a multiplier 1304 to which is also applied the signal Wd via an amplifier 1304 to which is also applied the signal Wd via an amplifier 1305 which has an amplification factor 1/Teh. The output signal from the multiplier 1304 constitutes a second calculated value for $Wec=Wd\cdot Tc/Teh$, which relates Wec to the drive shaft speed Wd having regard to the power requirement from the propulsion arrangement (i.e. $Wec\cdot Teh=Wd\cdot Tc$). The signal Wd is also applied to an attenuator 1306 having an attenuator factor 1/1.5. The output signal from the attenuator 1306 constitutes a third calculated value for $Wec=Wd/1.5$, which limits the value of Wec having regard to the highest gear ratio afforded by the continuously variable gear. This signal Wd/1.5 is the signal applied to one input of comparator 1037 in the E→F+E mode control logic circuit of FIG. 10c. The signal Wd is further applied to an amplifier 1307 which has an attenuator factor of −4, so that Wec can also equal −4 Wd. This value of Wec serves as a limit value when reverse gear is selected and is produced only when the select signal R is produced to operate switch contacts R/S1 which like the switch contacts R/S in FIG. 12 can be contacts of a relay which is energised when the select signal R is produced. Respective rectifiers 1308–1311 tend to feed the different signals Wec to a common line 1312 which is connected via a resistor 1313 to ground (0 volts). Thus, only the signal Wec having the highest value will be fed on to the common line 1312 via its respective rectifier, the rectifiers pertaining to the other signals Wec being reverse biassed by the presence of the highest value signal Wec on the common line 1312. This highest value signal Wec is applied via a relay contact 1341 to one input of an adder 1314. It is also applied over a lead 1315 to the logic circuit of FIG. 14. A relay 1316 controls the contacts 1341. If the flywheel clutch is to be engaged the signal ER from FIG. 11 is applied to a buffer amplifier 1317 the output from which energizes relay 1316. Contact 1341 is now changed over so that Wec=Wf.

A second input signal to the adder 1314 is representative of $-We$, this signal being produced by an amplifier 1318 having an amplification factor $\times(-1)$ in response to the signal We representative of the present engine speed. The output signal from the adder 1314 is applied via an attenuator 1319 having an attenuation factor 1/1000 to one input of second adder 1320. A signal representative of the factor 0.25 is applied to this adder 1320, the output signal from which is applied to one input of a third adder 1321. The output signal of an attenuator 1322 is applied to the second input of the adder 1321, this attenuator 1322 having an attenuation factor 1/10 Teh and having the signal Tc applied to it. The output signal from the adder 1321 is applied to another attenuator 1323 having an attenuation factor 1/Wem, Wem being the highest speed that the engine is allowed to reach. The output signal from the attenuator 1323 is applied to one input of a multiplier 1324 to other input of which is applied the signal We. The output signal from the multiplier 1324 is the throttle control signal $Rt = We/Wem$ $(0.25 + 10^{-3}$ $(Wec - We) + 0.1$. $Tc/Teh)$. In this equation for Rt, the term We/Wem provides a general throttle setting which is qualified by the remainder of the equation, of which $+0.25$ is an idling factor which is assumed to give We approximately in no-load conditions, $+10^{-3}(Wec - We)$ is a servoing factor representative of the difference between the calculated engine speed and the actual engine speed, and the term $+0.1$ Tc/Teh provides a small component to take account of the power being demanded from the engine directly (rather than only through the servoing factor). This control signal Rt, which is applicable to operation in the E mode, is applied to an output lead 1325 via three contacts 1326, S/S and 1327. The contact 1326 is a relay contact controlled by a relay 1329 which is energised by the output from a buffer amplifier 1330 to which the "flywheel charge" instruct signal FCH* is applied. When the contact 1326 operates a fixed value of Rt−Rtl is produced, Rtl being a value that would cause the engine to idle at approximately Wem. The contact S/S is operated when the selected signal S is produced so that when the engine is initially started Rt=Ra, that is it is directly related to actuation of the accelerator pedal. The contact S/S is suitably a relay contact the relay of which is energized when the select signal S is produced. The contact 1327 is a relay contact controlled by a relay 1328 which is energized by the output from a buffer amplifier 1331 to which the control signal Fc is applied. When contact 1327 is operated it completes a circuit for producing a value for the throttle control signal Rt which is applicable to operation in the F+E mode.

An adder 1332 produces a signal representative of the difference between the flywheel speed Wf and the high target flywheel speed Wfh. The signal Wf is applied to one input of the adder 1332 via an amplifier 1333 having an amplification factor $\times(-1)$. The signal Wfh=3000 (r.p.m.) unless the extra power program EP has been selected, in which case Wfh=3500 (r.p.m.). A switch contact EP/S is operated when the extra power program is selected, this contact EP/S being for instance a relay contact the relay of which is energised by the select signal EP. The output signal from the adder 1332 is applied to an attenuator 1334 having an attenuation factor 1/200. The output signal from the attenuator 1334 is applied to one input of an adder 1335 to the other input of which is applied a signal representative of the factor 1. The output signal from the adder 1335 is representative of $1-\Delta$, where $\Delta=(Wf-Wfh)/200$. This output signal is applied to one input of a multiplier 1336 to the other input of which is applied a signal representative of Wf/Wem, which is produced by an attenuator 1337 having an attenuation factor 1/Wem in response to the signal Wf. A comparator 1338 determines whether Wf>Wfh and produces a '1' output when this condition is satisfied. This output is applied to a buffer amplifier 1339 the output from which energises a relay 1340 which controls a relay contact 1342. Thus it can be seen that when Wf<Wfh (relay 1340 un-energized), Rt=Wf/Wem. When Wf>Wfh (relay 1340 energized), Rt=Wf/Wem $(1-\Delta)$=Wf/Wem. $[1-(Wf-Wfh)/200]$. In the first equation, the throttle setting is simply determined as the fraction of the flywheel speed to the maximum engine speed, this giving approximately the throttle setting for minimum specific fuel consumption. In the second equation, this throttle setting is qualified to a lower value to prevent the flywheel speed rising significantly above Wfh.

Figure 14:
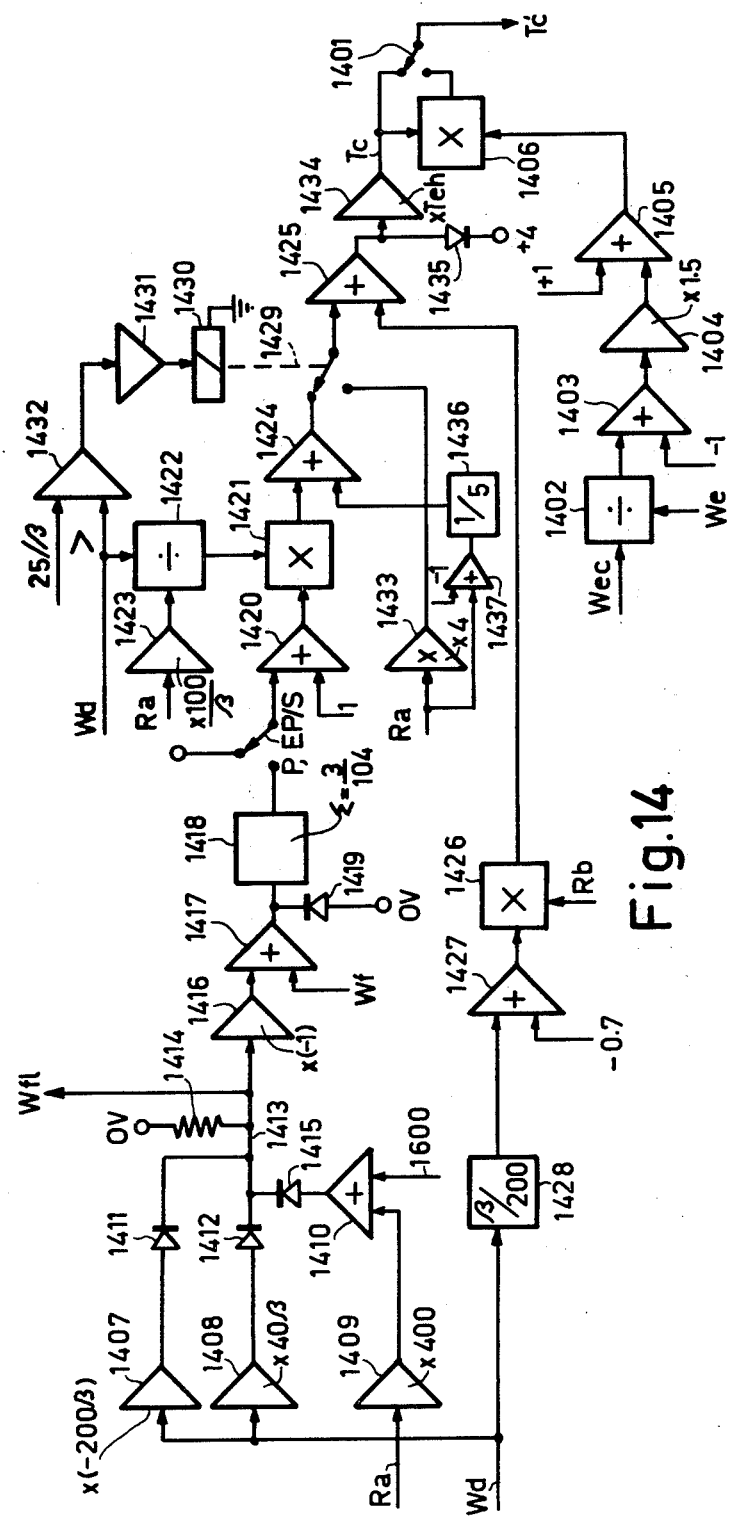

The logic circuit for calculating the torque command signal (Tc) Tc' is shown in FIG. 14. This logic circuit considers certain factors for calculating the value for the signal Tc' when the E mode is in effect, in addition to other factors which are considered when the F and F+E modes are in effect. A relay contact 1401 which is controlled by the relay 1328 in FIG. 13 determines which factors are applied. Consider the first part of the calculation for the signal Tc' for the E mode, this is effected by a divider 1402, an adder 1403, an amplifier 1404, a second adder 1405 and a multiplier 1406. The divider 1402 produces an output signal representative of We/Wec in response to the signals We and Wec, the latter being produced on lead 1315 in the logic circuit of FIG. 13. This divider output signal has the factor $-1$ added to it in the adder 1403, the output signal from which is applied to the amplifier 1404. This amplifier 1404 has an amplification factor $\times 1.5$ and its output signal has $+1$ added to it by the adder 1405. The resultant signal at the input to the multiplier 1406 is representative of $(1+1.5[We/Wec-1])$. The factor 1.5 (We/Wec−1) is included to reduce the load on the engine when We is less than the commanded speed Wec.

The remainder of the logic circuit produces a calculated value for the torque command signal Tc, which is used for the F and F+E modes (when Tc=Tc'), but which is multiplied in the multiplier 1406 with the resultant signal just derived above to provide a value for Tc' for the E mode. The low target flywheel speed (Wfl) which is also used for the mode control logic circuits 10a to 10c is derived by three amplifiers 1407, 1408 and 1409 and an adder 1410. The signal Wd is applied to the amplifiers 1407 and 1408 which have amplification factors of $\times(-200\beta)$ and $\times 40\beta$, respectively. The output signals from these two amplifiers are fed via respective rectifiers 1411 and 1412 to a common line 1413 which is connected to ground (0 volts) via a resistor 1414. The amplifier 1409 has the signal Ra applied to it, and it has an amplification factor $\times 400$. The output signal from this amplifier is applied to one input of the adder 1410 to the other input of which is applied a signal representative of 1600 (r.p.m.). The output signal from the adder 1410 is fed via a rectifier 1415 to the common line 1413. Thus the signal of highest value will appear on the common line 1413 through the conducting rectifier and so reverse biasing the other rectifiers. This highest value signal constitutes the low target flywheel signal Wfl which is applied to an amplifier 1416 having an amplification factor $\times(-1)$. 1600 r.p.m. is a limiting low speed for Wfl. By adding to this figure the factor 400Ra the value for Wfl is progressively increased as Ra increases, up to Wfl=2000, when Ra=1. The effect of this is to limit the maximum torque Ti that can be present at the input to the continuously variable gear (i.e. on shaft 10-FIG. 1) due to the flywheel plus engine. This is illustrated graphically in FIG. 20 which shows a curve Ra=1 for Ti against Wp(=We=Wf). If Tim is the maximum permissible value of Ti, this value will be exceeded when Wfl=1600, for Ra=1. However, by making Wfl a function of Ra, Wfl is increased to 2000 when Ra=1 at the torque limit Tim. Since Wfl determines a mode change, there is always a change to the E mode from the F+E mode when the input torque limit of the continuously variable gear is reached. Thereafter, the engine speed can be increased to maintain the power demand at a reduced torque. Wfl is limited to Wd.40$\beta$ to cater for the available range of gearing of the continuously variable gear. This is illustrated graphically in FIG. 21 in which flywheel speed Wf is plotted against vehicle speed Vd=Wd.$\beta$. At a gear ratio giving say 25 mph/1000 r.p.m, Wfl can be 1600 when Vd=40, but has to increase to 2000 when Vd=50. Above Vd=50, Wfl is increased as a linear function of vehicle speed. This leaves a margin of gearing so that for Vd=50 to 60 (as well as below 50) the flywheel can be reconnected using a higher gear ratio, the limit being 30 m.p.h./1000 r.p.m. Wfl is also limited to $-200$Wd·$\beta$ to take account of the limited range of gearing available in reverse. When the vehicle is in reverse, Wd is negative so that Wfl has a positive value. At a low reverse gear ratio of, say, 5 m.p.h./1000 r.p.m., the flywheel speed becomes a linear function of vehicle speed at a low negative value of Vd.

Returning to FIG. 14, the output signal from the amplifier 1416 is applied to one input of an adder 1417 to the second input of which is applied the signal Wf. The output signal from the adder 1417 is representative of (Wf−Wfl) and is applied to an attenuator 1418 which has an attenuation factor $\Sigma = 3/10^4$. This factor $\Sigma$ is a power boost factor which gives an excess flywheel speed above Wfl, this excess being used to define the fraction of extra power above Wem·Teh that is provided in the F+E mode when Ra=1. A rectifier 1419 clamps the output signal from the adder 1417 to ground (0 volts) if this signal tends to go negative (i.e., Wfl>Wf). The output signal from the attenuator 1418 appears at one terminal of a switch contact EP, P/S.

This switch contact normally applies a signal representative of the factor 0 unless the power or the extra power control programme is selected. Either the select signal P or EP can energize a relay which controls the contact P, EP/S so that the attenuator output signal is applied to one input of an adder 1420 instead of the factor 0. The other input to the adder 1420 receives a signal representative of the factor 1. The output signal from the adder 1420 is applied to one input of a multiplier 1421. A second input to this multiplier 1421 receives the output signal from a divider 1422 which has the signal Wd applied to one input and the output signal from an amplifier 1423 applied to its second input. The amplifier 1423 has an amplification factor $\times 100/\beta$, and receives the signal Ra.

The output signal from the multiplier 1421 is applied to one input of an adder 1424 to the other input of which is applied the output signal from an attenuator 1436 having an attenuation factor of 1/5. This attenuator 1436 receives the output signal from an adder 1437 which receives the signal Ra and a further signal representative of the factor $-1$. Thus the attenuator 1436 produces an output signal which is representative of a small negative component of Tc and which reduces as the value of Ra reduces, being equal to 0 when Ra=1. The effect of this negative component is shown in the Ra curves in FIG. 18, providing a $-0.1$ step in the curve Ra=0.5 and a $-0.2$ step in the curves Ra=0 and Rb=1. There is no negative step in the curve Ra=1. The output signal from the adder 1424 is applied to one input of a further adder 1425. A second input of this adder 1425 receives the output signal from a multiplier 1426. The signal Rb is applied to one input of this multiplier 1426 and the output signal from an adder 1427 is applied to a second input. An attenuator 1428 of attenuation factor $\beta/200$ provides one input signal to the adder 1427 in response to the signal Wd. A signal representative of the factor $-0.7$ is applied to a second input of the adder 1427.

The output signal from the adder 1424 is applied via a normally closed relay contact 1429 to the said one input of the adder 1425. This relay contact 1429 is controlled by a relay 1430 which is energized by the output signal from a buffer amplifier 1431. A comparator 1432 applies a '1' output signal to the input of the buffer amplifier 1431 when 25/$\beta$>Wd. When the relay 1430 is energized, the contact 1429 switches to apply the output signal from a multiplier to the said one input of the adder 1425. This multiplier 1433, which has an amplification factor $\times 4$, has the signal Ra applied to its input.

The output signal from the adder 1425 is applied to a further multiplier 1434 having an amplification factor $\times$Teh. A rectifier 1435 clamps the input to the multiplier 1434 to a reference signal representative of the factor $+4$ to prevent the value of torque commanded ever rising above 4 Teh. The output signal from the multiplier 1434 constitutes the torque signal Tc which for the F mode and the F+E mode forms the signal Tc'. For the E mode in which contact 1401 switches the signal Tc' is the output signal from the multiplier 1406.

It can be readily deduced from the logic circuit of FIG. 14 that the torque command signal Tc' can have any of the following values:

Tc=Teh [f1(Ra)+f(Rb)] when Vd<25 m.p.h.

Tc=Teh [f2(Ra)+f(Rb)] when Vd>25 m.p.h. in the normal and light load control programs.

Tc=Teh [f3(Ra)+f(Rb)] when Vd>25 m.p.h. in the power and extra power control programs.

$f1(Ra)=4Ra$ and imposes the aforementioned torque limitation of 4 Teh which represents approximately the drive shaft torque available in first gear with a manual gear box.

$$f2(Ra)=100Ra/Vd-0.2(1-Ra)$$

$$f3(Ra)=(100Ra/Vd)[1+\Sigma(Wf-Wfl)]-0.2(1-Ra).$$

The factor 100/Vd is Wem/Wd which in the equation for f2(Ra) thus defines that the power commanded ($=fcWd$) equals Teh·Wem when Ra=1. The speed of 25 m.p.h. below which the torque limitation arises comes from Ra=1 and Tc=4 Teh in the second equation for Tc. $\Sigma(Wf-Wfl)$ is the boost factor already discussed and $-0.2(1-Ra)$ is the correction factor for Ra which has also already been discussed.

$f(Rb)=(0.7-5\times10^{-3}Vd)$ Rb is the negative component of the torque commanded which likewise has already been discussed.

These equations for Tc relate to the F and F+E modes for which Tc'=Tc. For the E mode, $Tc'=Tc[1+1.5(We/Wec-1)]$. The term in brackets which multiplies Tc, is a reduction factor which temporarily reduces the commanded value of Tc to allow the engine to be speeded up in the E mode following the F+E→E transition.

Various modifications are possible within the scope of the invention. For instance, it is envisaged that the variable transmission could alternatively comprise a DAF Variomatic transmission of the belt-drive type (see Automobile Engineer, December 1962, pages 494 to 500) in which the ratio of the drive could be arranged to be varied by varying the loading on the driving pulley using variable fluid pressure which is controlled by logic circuitry in the manner described herein, with the drive pulley loading providing the torque reaction for servoing purposes. Another possibility is to use a hydrostatic transmission arrangement consisting, for example, of a variable delivery pump and a variable displacement motor. Such a transmission arrangement naturally gives equal speeds and powers in forward and reverse and can advantageously be combined with an epicyclic transmission to give smaller reverse speeds and greater forward speeds, thus enabling hydrostatic units of reduced power rating to be used. In the case of hydrostatic transmissions using fixed displacement motors, output torque is directly proportional to pressure.

Speed measurement of the various shafts of the propulsion arrangement can be achieved using Hall effect transducers which derive signals from a set of markers on their respective shafts (e.g. the toothed metal rings rotatable with the shaft), the control circuit including in respect of each transducer two counters to which the signals from the transducer occurring in successive time periods are applied alternately. The difference between the counts of the two counters then represents the change in shaft speed in successive time periods. Another way of effecting a shaft speed measurement would be for the control circuit to include a frequency oscillator clock ($\doteq 5$ MHz), which may be frequency controlled by a surface wave device, and to count the number of oscillations between successive signals from a marker on the shaft. Accurate speed measurement can be achieved by summing the counts over, say, 10 rotations of the shaft, and changes in shaft speed found by taking differences as described above. Flywheel speed measurement can be accurate, for instance to 1 part in 10,000, in order to determine accurately the torque provided by the flywheel. The speed signals thus derived could readily be converted to d.c. voltage levels for application to the logic circuits already described.

Alternative Computations

The component of the commanded toqrque Tc that can be provided by the flywheel can alternatively be derived using the following equations (1) to (9), which determine this component in terms of the rates of change of the input/output speed ratio of the continuously variable gear. This component can be added to the component (if any) which the engine is assumed to provide from the known values of Rt and We.

If the flywheel only is coupled to the vehicle drive shaft (the engine clutch is disengaged) the torque (Tp) applied to the vehicle drive shaft is:

$$Tp/e=3Vtf=-3VIdwf/dt \qquad (1)$$

where:
  3V is the overall (variable) gear ratio between flywheel and the vehicle drive shaft
  I is the moment of inertia of the flywheel (e.g. 0.5 Kgm²)
  Wf is the angular velocity of the flywheel.
  e is the power transmission efficiency flywheel-to-vehicle drive shaft But $$Wf=3VWp \qquad (2)$$

$$\therefore dWf/dt=Wpdv/dt+3VdWp/dt \qquad (3)$$

From equation (1):

$$Tp/e=-3VIWp\frac{dV}{dt}-9V^2I\frac{dWp}{dt}$$
$$=-IWf3\frac{dv}{dt}-9V^2I\frac{dWp}{dt} \qquad (4)$$

From equation (4) it can be seen that to make Tp=Tc (the required torque) the control circuit can calculate the required value of dV/dt from the measured value of Wf and the measured value of $3V(=Wf/Wp)$, provided that the value of dWp/dt can be estimated.

To estimate the value of dWp/dt:

$$\frac{dWp}{dt}=\frac{Tp-Td}{Ive} \qquad (5)$$

where
  Td is the total drag (retarding force) on the vehicle, referred to the vehicle drive shaft.
  Ive is the equivalent moment of inertia of the vehicle referred to the vehicle drive shaft.

$$Ive=MvRw^2/N^2 \qquad (6)$$

where
  Mv is the mass of vehicle (assuming typical laden weight)
  Rw is the radius of driven road wheels
  N is the axle ratio between vehicle drive shaft and wheels.

Substituting equation (5) in equation (4):

$$Tp\left(\frac{1}{e}+\frac{9V^2I}{Ive}\right)=-IWf\frac{dv}{dt}+\frac{9V^2I}{Ive}Td \qquad (7)$$

-continued $$\therefore \frac{dv}{dt} = -\frac{Tp}{e} \frac{(1 + 9eV^2I/Ive)}{IWf} + \frac{9V^2}{WfIve} Td \quad (8)$$

Equation 8 shows the value of dV/dt required for a given value of Tp (namely the value Tc demanded by the driver) the only unknown being Td.

The basic control strategy would be based on assuming a value for Td (Td'(t)) that is essentially the same as the value of Td found during the last time interval Td (t−Δt). During that time interval the average Tp is calculated from equation (4) (the differentials being replaced by finite differences). Using this value of Tp the value of Td is calculated from equation 5.

In order to have a stable control system it is assumed that $$Td'(t) = Td'(t-\Delta t) + m[Td(t-\Delta t) - Td'(t-\Delta t)] \quad (9)$$

where

Td'(t−Δt) is the value assumed during the last interval.

m is a number between 0 and 1, typically taken as ½.

In the overall propulsion arrangement shown in FIG. 1, the control signal Ra is produced from a potentiometer in response to actuation of the accelerator pedal, whereas the control signal Rb is produced from a pressure transducer in response to actuation of the brake pedal. As a further modification, either potentiometers or pressure transducers could be used for producing both the control signals Ra and Rb.

As applied to a vehicle, the propulsion arrangement preferably includes indicating lamps to indicate to a driver which control program he has selected. Further lamps could indicate that the flywheel is storing useful energy (e.g. Wf>Wfl+200) and that the flywheel is over-speeding (Wf>Wfm).

When applying the propulsion arrangement to an otherwise conventional vehicle, the alternator (or dynamo) of the vehicle should be driven off the input shaft to the continuously variable gear which is always driven when the vehicle is in motion. Also, the water pump should be driven electrically to provide water circulation to the heater in the F mode, when required. The fan should also be electrically driven, but this is now fairly common practice anyway.

A flexible coupling between the engine and flywheel (e.g. between engine clutch and bevel gear) may be necessary. Although the clutch plate springs provide some flexibility, the resonant frequency for torsional vibrations would otherwise approach 10,000 r.p.m., and sub-harmonics (stimulated by the pulsating engine power) could occur in the operational F+E mode range. The flexible coupling should bring the resonant frequency down to approximately 1000 r.p.m. which is outside the normal operating range. When accelerating the flywheel from rest, the engine clutch is slipped up to and beyond 1000 r.p.m. and thus no torque fluctuations should be transmitted in the critical speed range.

What we claim is:

1. A propulsion arrangement for a vehicle, comprising
   an engine having an output shaft,
   a first shaft,
   first means for coupling and de-coupling said output shaft to and from said first shaft, in the coupled condition said shafts rotating at a first fixed speed ratio therebetween,
   a flywheel,
   second means for coupling and de-coupling said flywheel to and from said first shaft, in a coupled condition said flywheel and first shaft rotating at a second fixed speed ratio therebetween,
   a variable transmission means having an input connected to said first shaft, and an output,
   a vehicle drive shaft connected to the transmission output,
   driver operable controls,
   means for sensing rotational speeds of said engine, said flywheel, and said drive shaft,
   electronic control means responsive to said driver operable controls and speed of said engine, flywheel and the drive shaft for controlling power supplied by the engine and the input/output ratio of the transmission means, and for selectively operating said first and second means for coupling and de-coupling, and
   means for applying a small coupling torque between said flywheel and said first shaft when said second means is in a de-coupled condition and said first shaft speed is greater than a predetermined value.

2. An arrangement as claimed in claim 1, comprising in addition an independent centrifugal clutch means, responsive to flywheel speed exceeding a given maximum value, for dis-engaging said flywheel from coupling to said first shaft.

3. An arrangement as claimed in claim 1 wherein said second means includes a friction clutch, and said means for applying a small coupling torque includes means for engaging said friction clutch with limited force.

* * * * *